United States Patent [19]

Pohlman et al.

[11] 4,112,490
[45] Sep. 5, 1978

[54] DATA TRANSFER CONTROL APPARATUS AND METHOD

[75] Inventors: William B. Pohlman, Los Gatos; Andrew M. Volk, Santa Clara, both of Calif.

[73] Assignee: Intel Corporation, Santa Clara, Calif.

[21] Appl. No.: 744,469

[22] Filed: Nov. 24, 1976

[51] Int. Cl.$^2$ .............................................. G06F 3/00
[52] U.S. Cl. ................................................... 364/200
[58] Field of Search ........................ 364/200 MS File

[56] References Cited

U.S. PATENT DOCUMENTS

| | | | |
|---|---|---|---|
| 3,243,781 | 3/1966 | Ehrmann et al. | 364/200 |
| 3,943,495 | 3/1976 | Garlic | 364/200 |
| 3,967,246 | 6/1976 | House | 364/200 |
| 4,004,281 | 1/1977 | Bennett et al. | 364/200 |

Primary Examiner—Harvey E. Springborn
Attorney, Agent, or Firm—Spensley, Horn & Lubitz

[57] ABSTRACT

An improved data transfer apparatus and method is fabricated by multiplexing at least a portion of the address of the peripherals on the data bus. Data transfer is simplified by adopting identical control timing for the read and write cycles, setting up address and data information early within a cycle and synchronizing the output of such information on the output busses coupled to the peripherals. Data transfer control signals may be encoded to simplify read and write input/output and memory operations. The advantage of such improvements permits reduce component count, pin requirements and gives rise to an ability to incorporate more system functions on a single chip.

11 Claims, 16 Drawing Figures

DATA BUS CONTROL LOGIC

DATA BUS BUFFER

DATA TRANSFER CONTROL APPARATUS AND METHOD

BACKGROUND OF THE INVENTION

1. Field of Invention

The present invention relates to the field of central processing units in microcomputers in which data is transferred between a central processing unit and a multiple of peripherals including input/output devices and memories.

2. Description of the Prior Art

A typical computer system, such as marketed by Intel Corporation under the trademark, Intel 8080, since at least 1975, consists of a central processor unit (CPU), a memory, and input/output devices. (A copy of a user's manual describing the Intel 8080 having been deposited and made of record herein as an attachment to the application). The memory stores instructions and data. The program, formed by a group of logically related instructions, is stored in the memory. The CPU reads each instruction in sequence or as directed by the program. Based upon the content of the instruction, the CPU will obediently perform the specified operations which may include internal data processing with the CPU and bidirectional transfer of digital information between the CPU, the memory and the input/output devices or ports. The CPU may be combined with a plurality of external masters to cooperate on a system level to execute system instructions. External masters are defined as any external circuit which may use the external busses which are also used by the CPU. These external masters include external CPUs, computers, and bus control circuits, such as direct memory access (DMA) controllers such as the circuit marketed under the trademark Intel 8257, or interrupt controllers such as the circuit marketed under the trademark Intel 8259.

The activities of the central processor are cyclical. The processor fetches an instruction, performs the operations required, fetches the next instruction and so forth. An instruction fetch is merely a special memory read operation that brings the instruction to the CPU's instruction register. The instruction fetch may then call for data to be read from the memory to the CPU. The CPU again issues a "read" signal and transmits the proper memory address to the memory. The memory responds by returning the requested word. The data received is placed in the accumulator or one of the other general purpose registers within the CPU. A memory write operation is similar to a "read" except for the direction of data flow. The CPU issues a "write" signal, sends the proper memory address, and then sends the data word to be written into the addressed memory location. Input and output operations are similar to memory read and write operations with the exception that a peripheral input/output device is addressed instead of a memory location. The CPU issues the appropriate input or output control signal, sends the proper device address and either receives the data being input or sends the data to be output.

Clearly, the coordination and timing of instructions and data transfers between input and output devices, the memory and the CPU is critical and may be complex. Furthermore, large areas of chip space within integrated circuit CPU, input and output devices, and memories are consumed by coupling with external bus terminals. Therefore, it would be advantageous if a computer system could be designed which would reduce the number of bidirectional information bus lines and terminals, and institute a simplified data transfer protocol between the CPU and the peripherals without sacrificing the capacity, speed, and flexibility of data flow within the computer system.

BRIEF SUMMARY OF THE INVENTION

The present invention is an apparatus for transferring digital information between the apparatus and a plurality of peripheral devices such as memory or input/output devices. Information may be transferred in a plurality of transfer modes. The apparatus and the plurality of the peripheral devices are each coupled to separate ends of a control bus, and an address and data bus. The apparatus is used in combination with a first means, which is a plurality of registers, control and timing circuitry and an arithmetic and logic unit well known to the art which are combined and organized in a conventional fashion to form the internal, operative elements of a central processing unit, which selectively processes digital information in response to a programmable set of instructions or program. The first means also generates a plurality of internal control signals which are coupled to the apparatus. The apparatus comprises a second means, which includes a data buffer and multiplexer in combination with a data bus controller circuit, for multiplexing digital data on at least part of the address and data bus. The second means is coupled to the first means. The apparatus also includes a third means, an external control output circuit for generating and receiving a plurality of external bus control signals encoded to inform the peripheral devices of the availability of at least part of the address and data bus for transfer of information in one of the transfer modes. The third means is coupled to the first means. The second and third means may also be coupled. Advantages obtained by this combination is characterized by simplified control of the address and data bus, by reduction of component count in the required pin count, and by a substantial increase in the number of system functions which may be included on a single chip.

The apparatus of the present invention may further include a fourth means, an external control input circuit, for generating and receiving a plurality of external system control signals which are used to selectively suspend and reinitialize operation and control which the first means has over the address and data bus. The fourth means is coupled to the first means and may be coupled to the second and third means as well.

Finally, the apparatus of the present invention may further include a fifth means, an interrupt circuit, for generating and receiving a plurality of external system interrupt signals to selectively interrupt operation of the first means according or as directed by the program. Interruption of the first means permits the first means to selectively process digital information in response to another programmable set of instructions such as subprogram or subroutine.

The method of the present invention is employed for transferring digital information or data between a central processor and a plurality of peripheral devices in a plurality of transfer modes which may include a plurality of external master circuits. Data may broadly include address data and digital data to be processed. The central processor is coupled to an address, a multiplexed address/data, and control bus. The method comprises the steps of generating an input-out/memory status signal during at least a first clock cycle on a first line of the control bus. The input-output/memory signal indicates to the peripheral devices whether the following read or write signal is in a memory or input/output transfer mode. A first portion of a digital address is generated on the address bus during at least the first clock cycle to provide a partial address to the peripheral devices. A second portion of the digital address signal is generated on the address/data bus during the first clock cycle to provide the remaining portion of the address to the peripheral devices. An address latch enable signal is generated on a second line of the control bus during the first clock cycle to permit the second portion of the digital address to be latched into the peripheral devices. Then, a data signal is generated on the address/data bus during at least a second clock cycle to provide digital informatin to be transferred between the central processor and the peripheral devices. Finally, an operation signal is generated during at least the second clock cycle on a selected line of the control bus to indicate that the address/data bus is available for transfer of digital information in the mode indicated as encoded by the operation signal and the input-output/memory status signal.

The operation signal includes a "read" signal on a third line of the control bus to indicate that digital information held by the addressed peripheral device is to be read onto the address/data bus, and includes a "werite" signal on a fourth line of the control bus to indicate that the digital information on the address/data bus is to be written into the addressed peripheral. The method of the present invention may further include generating a "ready" signal on a fifth line of the control bus. The "ready" signal is generated by the peripheral device during a given clock cycle to indicate the availability of the peripheral device to submit to the "read" or "write" signal. The "ready" signal assumes a first or active state to indicate the availability, and a second or inactive state to indicate the unavailability of the peripheral device. During the period of unavailability, the central processor maintains the condition of the address and address/data busses and input-output/memory status signal until the "ready" signal indicates availability. At this point, the central processor continues its normal operations.

In addition, the method of the present invention may further include further steps whereby system interrupt signals having various priorities interrupt normal operation of the central processor and direct the operation of the central processor to a predetermined subprogram or subroutine.

Many other features of the present invention, both in the apparatus and in its method of use may be included and are best understood by examination of the detailed description of the present invention with reference to the following Figures.

DETAILED DESCRIPTION OF THE PREFERRED EMBODIMENTS

The present invention is an improved computer system protocol for the transfer of information between a CPU and peripherals, including memory devices and input and output devices.

The external bus protocol is based upon the processor timing. Certain fundamental concepts, in common with the prior art, in regard to processor cycling might first be set forth in order that the present invention may be easily understood. An instruction cycle in the CPU is defined at the time required to fetch and execute an instruction. During the fetch, a selected instruction of one to three bytes is extracted from memory and deposited in the CPU's instruction register and in appropriate registers elsewhere in the CPU. During the execution phrase of the instruction, the instruction is decoded and translated into specific processing activities. Every instruction cycle consists of one to five machine cycles. A machine cycle is required each time the CPU accesses the memory or an input/output port. The fetch portion of an instruction cycle requires one machine cycle for each byte fetched. The duration of the execution portion of the instruction cycle depends on the kind of instruction which has been fetched. Some instructions do not require any machine cycles other than the one necessary to fetch the instruction. On the other hand, other instructions require additional machine cycles to write or read data to and from the memory or input-/output devices. Each machine cycle (M1, M2 ... M5) consists of three to six states (T1, T2 ... T6). A state is the smallest unit of processing activity and is usually defined as the time interval between two successive positive or negative going transitions of a clock $\phi 1$ or $\phi 2$. The clock in the present invention is an internal clock which includes two nonoverlapping clock pulses $\phi 1$ and $\phi 2$. Thus, each clock cycle $\phi 1$ and $\phi 2$) marks a state, three to six states constitute a machine cycle, and one to five machine cycles comprise an instruction cycle.

Figure 1:
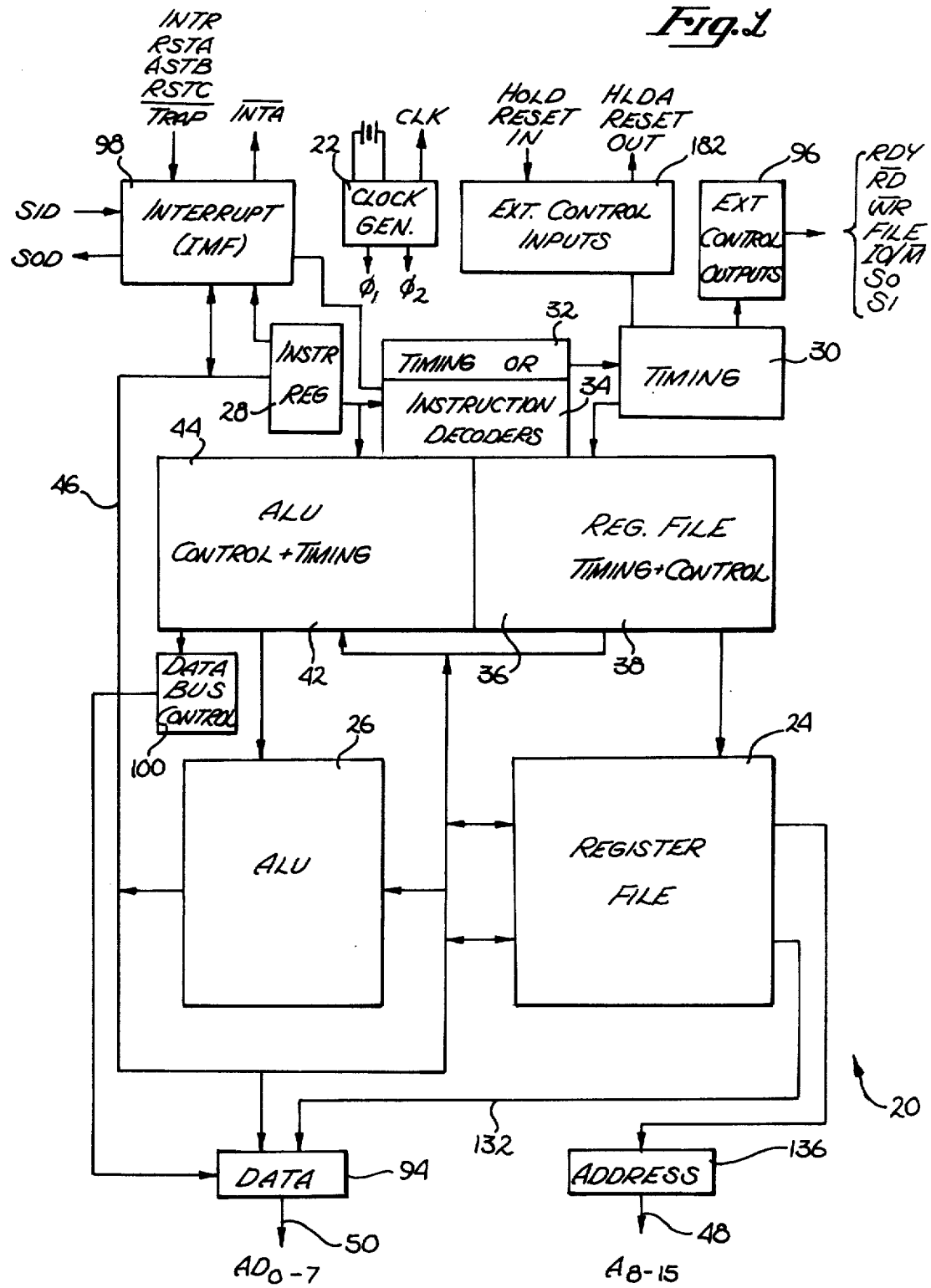
FIG. 1 is a block schematic of a central processor utilizing the data transfer protocol apparatus and method of the present invention.

FIG. 1 illustrates a typical CPU embodying the present invention. CPU 20 has as a functional component an internal clock generator 22, included within the first means, which generates the φ1 and φ2 clock pulses. Clock generator 22 is well known to the art and may be crystal controlled or controlled by an RC network external to the integrated circuit in which CPU 20 has been fabricated. Clock generator 22 generates an external output clock signal, CLK. The CLK signal may be used at the timer or clock for peripheral devices or to synchronize the timing of the same to CPU 20.

CPU 20 includes many functional blocks well known to the art as necessary or useful to the operation of a central processor. One such functional unit is a register file (RF) 24 which includes a multiple of registers, well known to the art, used for program, stack and internal data processing operations. Arithmetic and logic unit (ALU) 26 may include several additional registers such as accumulators, flag registers and temporary registers well known to prior art computer design, as well as including all arithmetic, logical and rotate circuitry used to compose, manipulate and process digital information. A third functional block in a typical CPU, as shown in FIG. 1, includes an instruction register (IR) 28 and a control section, which in the example of FIG. 1 includes an M and T state generator and timing logic circuitry 30 and various programmable logic arrays (PLA) and random logic circuitry. Such control circuitry includes a timing circuit 32 and instruction decoder 34, register timing control circuit 40, and an ALU timing and control circuit 44. Each of the logic circuits and PLA's are well known to the art and their internal construction is determined in part by the internal timing and execution parameters sought by the set of instructions which form the software language used in the microprocessor. Each of the above functional blocks as well as other circuitry included in prior art CPU's is collectively denoted as and is included in the first means claimed below.

Clearly, the details of internal timing control may be varied from one type of CPU to another and between CPU's employing distinct software languages. The various functional blocks may be coupled, as illustrated in FIG. 1 by an internal bus 46. The coordination, internal timing and coupling of the register file, the arithmetic and logic unit, and the instruction register and control section may be derived by principles well known to logic designers. The example of FIG. 1 is set forth only to generally illustrate the context of the present invention.

Figure 2:
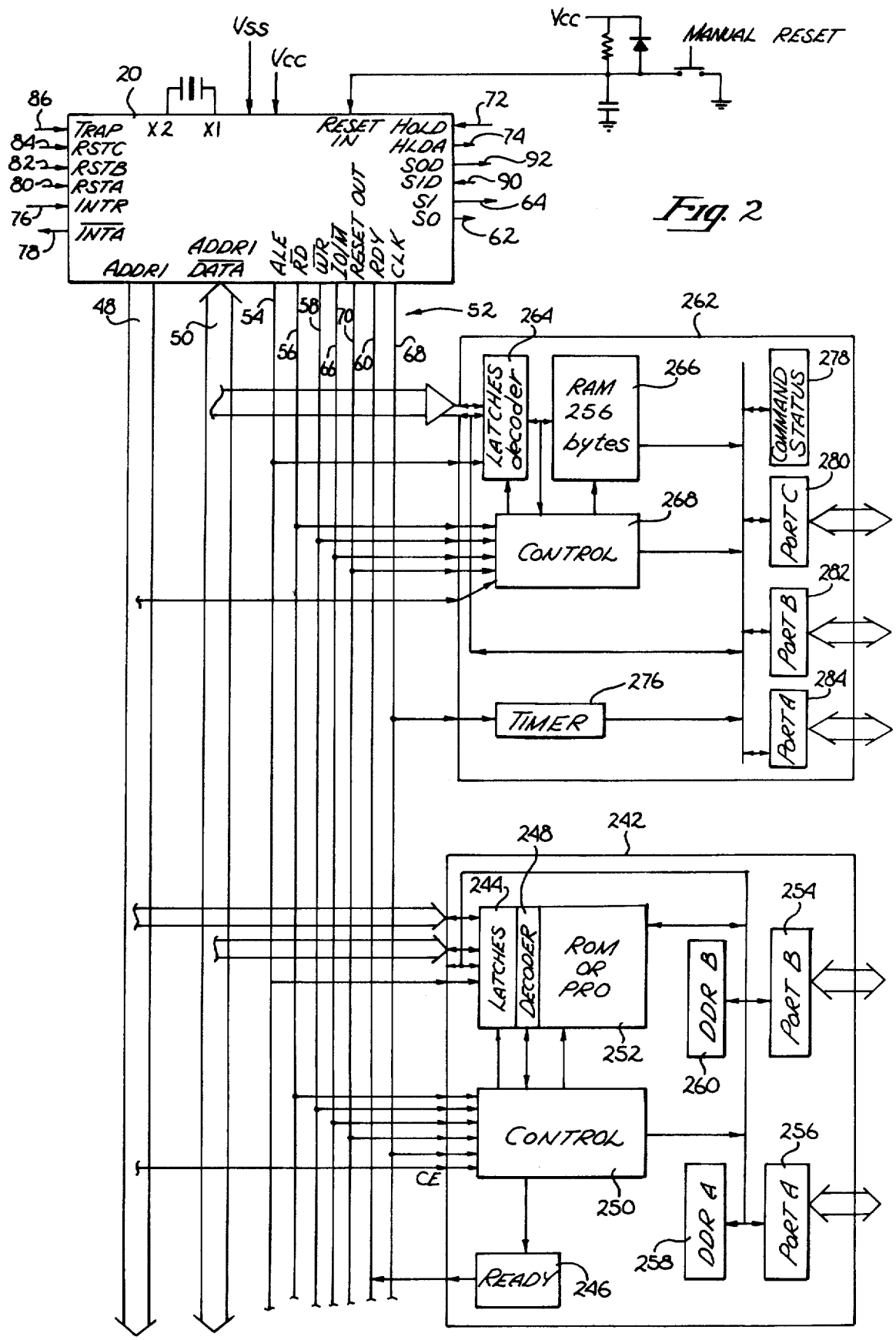
FIG. 2 is a block diagram illustrating one way in which the central processor may be coupled to peripherals in a minimum computer system.

FIG. 2 illustrates CPU 20 using the protocol of the present invention. The eight most significant bits of the memory address, as described below, are provided on address bus 48. The lower eight bits of the memory address or input/output address will appear on a multiplexed address/data bus 50. During a subsequent clock cycle, address/data bus 50 becomes a data bus wherein a byte of ditigal information is made available for transfer between CPU 20 and the peripheral devices. As described below, address bus 48 and address/data bus 50 are tristated or floated during "hold" and "halt" modes.

Control bus 52 includes an address latch enable (ALE) line 54 which is active during the first clock cycle of an instruction permits the address on address bus 48 and address/data bus 50 to be latched into the on chip latch of the peripherals. ALE may also be used to strobe status information. As before, ALE is tristated during the "hold" and "halt" modes and during reset Write Controlline 56 carries a "write" signal ($\overline{WR}$) which indicates that the data on address/data bus 50 may be written into the addressed memory or input/output location. Read control line 58 carries a "read" signal ($\overline{RD}$) and indicates that the address memory or input/output position is available for reading and that address/data bus 50 is available for data transfer. Both "read" and "write" control lines 56 and 58 are tristated during "hold" and "halt" modes. Ready control line 60 carries a "ready" signal (RDY) which is active during "read" or "write" operations. RDY indicates that the address memory or peripheral is ready to send or receive data. If RDY is low, CPU 20 will wait for RDY to go high before completing the "read" or "write" cycle. Control lines 62 and 64 carry the data bus status signals S0 and S1, respectively. The status of the bus cycle may be encoded by status signals S0 and S1 for use in an external master circuit whose operation may be preconditioned or modified by the status of the bus cycle. Encoding is given by the following table:

| TABLE 1 | S1 | S0 |
|---|---|---|
| Halt | 0 | 0 |
| Write | 0 | 1 |
| Read | 1 | 0 |
| Fetch | 1 | 1 |

Control line 66 carries an input-output/memory status signal (IO/M) which is encoded together with read ($\overline{RD}$) and write ($\overline{WR}$) as described below to indicate whether the "read" or "write" cycle is to a memory device or input/output device. 10/M is also tristated during "hold" and "halt" modes. Control line 68 carries the clock signal, CLK, described above. Control line 70 is provided for a reset "out" signal (RESET OUT) which is generated to indicate that CPU 20 is being reset. RESET OUT can be used as a system reset signal and is synchronized to the processor clock.

The present invention may also include several external control signals which, similar to RESET OUT, operate on a system level. For example, control line 70 is provided for the receipt of a "hold" signal (HOLD) which indicates that an external master circuit is requesting the use of address and address/data busses 48 and 50. CPU 20 upon receiving the "hold" request will relinquish the use of the busses as soon as the completion of the current machine cycle. Meanwhile, internal data processing may continue. CPU 20 may gain recontrol of the busses after "hold" is removed. After receipt of the "hold" signal, a "hold acknowledge" signal (HLDA) is generated on control line 74. HLDA indicates that CPU 20 has received the "hold" request and that it will relinquish the busses in the next clock cycle. When HLDA is generated, address bus 48, address/data bus 50 and most of control bus 52, including RD, WR, IO/M and ALE are tristated. HLDA goes low after the "hold" request is removed. CPU 20 then reassumes control over the busses one half clock cycle after HLDA goes low.

A CPU using the protocol of the present invention, may also include a plurality of system interrupt signals which will divert the activity of the central processor from the program to a designated subroutine. For example, control line 76 is provided to receive an "interrupt request" signal (INTR) which is used as a general purpose interrupt. INTR is sampled only during the last clock cycle of an instruction. If it is active, the program counter will be inhibited from incrementing and an "interrupt knowledge" signal ($\overline{INTA}$) will be generated on control line 78. Typically, a software program, such as a restart or call instruction, will be inserted by the external master into CPU 20 directing CPU 20 to jump to the interrupt subroutine. As described below, in addition to being enabled and disenabled by software, the circuitry which receives INTR may be disabled by an internal reset signal within CPU 20 and immediately after an interrupt is accepted. $\overline{\text{INTA}}$ is an output signal which is coupled to an external master and used in the same manner as a "read" signal during an instruction cycle. $\overline{\text{INTA}}$ activates an external master such as an Intel 8259 interrupt chip or some other interrupt port to provide the desired instruction.

The protocol of the present invention may also include a plurality of restart interrupts which have the same timing as INTR, but cause an internal restart instruction to be automatically generated within CPU 20. Typically, CPU 20 includes an interrupt logic circuit constructed from random logic according to principles well known to the art as determined by design choice. Such a circuit will automatically generate a predetermined restart instruction or cause the same to be generated by CPU 20 upon receipt by the apparatus of the present invention of an interrupt restart signal as described below. The presently illustrated embodiment includes three "restart interrupt" signals, denoted as RSTA, RSTB and RSTC received on control lines 80, 82 and 84 respectively. Control line 86 is provided to receive a fourth restart interrupt signal (TRAP) which, in the presently illustrated embodiment, is non-maskable. The five interrupt signals, TRAP, RSTC, RSTB, RSTA and INTRA are ordered by a priority logic circuit described below. TRAP has the highest priority, followed by RSTC, RSTB, RSTA and lowest in priority, INTR. Finally, the protocol of the present invention may also include an external control reset signal (RESET IN) provided on control line 88. RESET IN sets the progrm counter of CPU 20 to zero and resets an interrupt enable (INTE F/F) and HLDA flip-flop, described below. CPU 20 is held in a reset condition as long as RESET IN is applied.

Finally, the protocol of the present invention may also include a serial input data line 90 which allows data in a serial format to be stored within CPU 20, which is a parallel bit processor, in response to an instruction which may be denoted as RIM. A serial output data line 92 is also provided to provide data in a serial format from data, in a parallel format, stored within CPU 20 in response to a software instruction, denoted as SIM.

Figure 3:
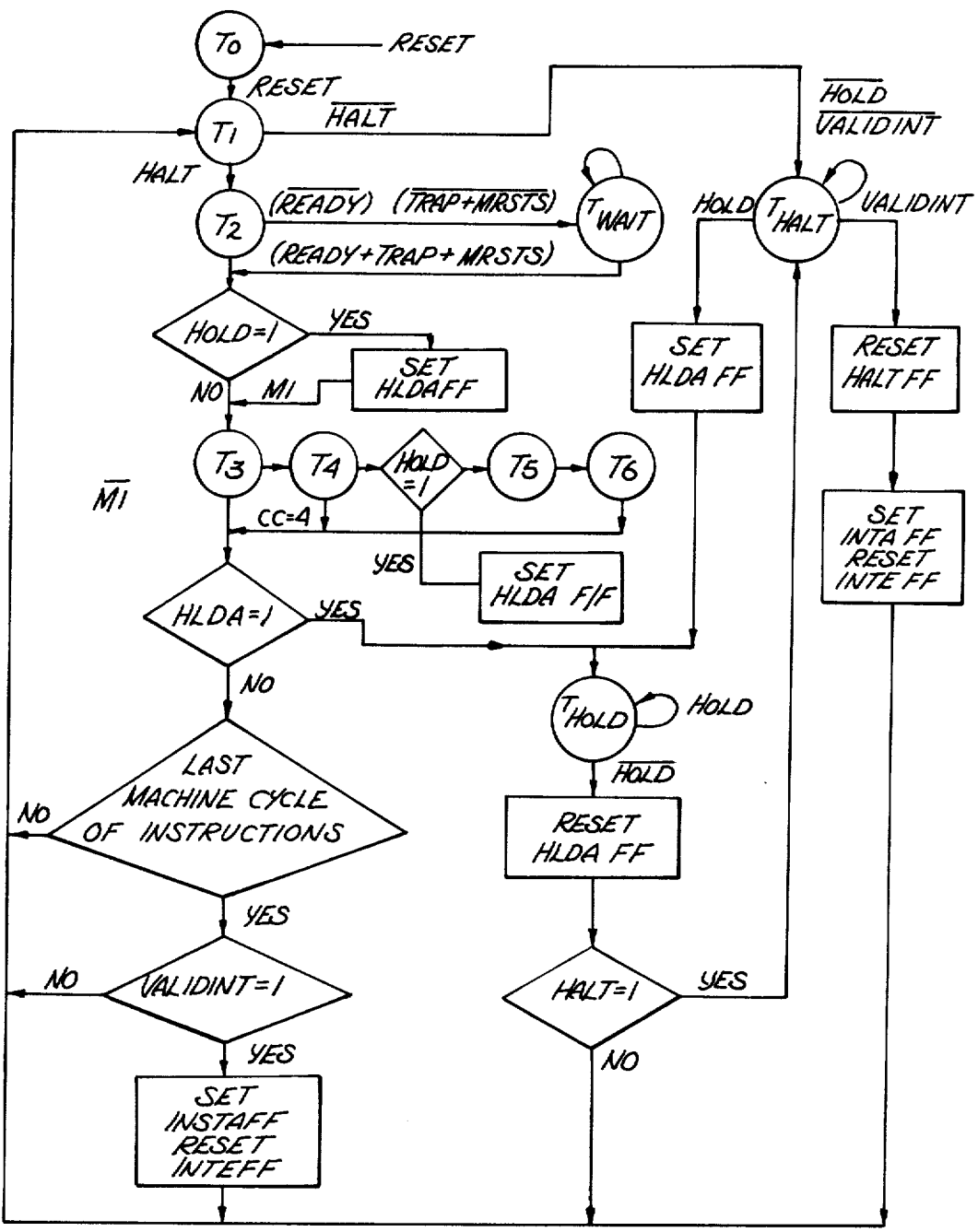
FIG. 3 is a flow-chart showing the internal transition states of a central processor organized according to the present invention.

The relative timing in operation of CPU 20 with respect to the protocol of the present invention may be better understood by viewing FIG. 3 in combination with FIGS. 4-9.

Figure 4:
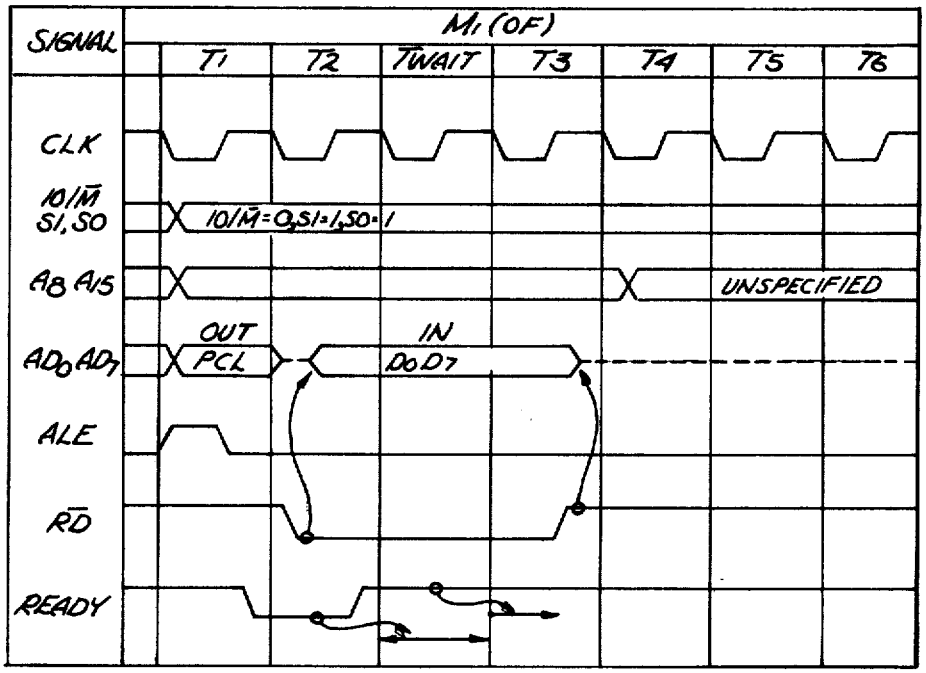
FIG. 4 is a timing diagram which shows a typical instruction fetch operation.

The first active T-state of any machine cycle of CPU 20 begins with a first clock cycle or T-state, T1. FIG. 4 shows a typical machine cycle for an instruction. Each instruction must begin with an instruction or opcode fetch in order that CPU 20 may know which operation to execute. CPU 20 will execute the fetched operation and then initiate another opcode fetdh in a cyclic manner. As shown in FIG. 4 in T1, three status signals are generated, IO/$\overline{\text{M}}$, S1 and SO, to define the type of machine cycle which is about to take place. Status signal IO/$\overline{\text{M}}$ identifies whether the machine cycle is a memory reference or an input/output operation. According to the code adopted in the present invention as set forth in Table 1 above, data signal S1 identifies whether the cycle is a read or write operation. Status signals S0 and S1 together identify whether the cycle is a read, write, opcode fetch or a software initiated cycle, HALT. As will be described below, status signal IO/$\overline{\text{M}}$ is active with the read, $\overline{\text{RD}}$ and write $\overline{\text{WR}}$ signals to form an encoded control bus. IO/$\overline{\text{M}}$, S1 and S0 may be used by well known external master control circuits in larger systems in order to identify and control the operation of CPU 20 relative to the larger system.

CPU 20 also provides a 16 bit address beginning in T1 on lines A15-A8 of address bus 48 and AD7-AD0 of address/data bus 50. A15-A8 represents the eight most significant bits of the address bus, and AD7-AD0 represents the eight least significant bits of the address on the multiplexed address and data bus. After a single clock cycle as shown in FIG. 4, the least significant bits on AD7-AD0 are removed and address/data bus 50 is floated as represented by the dotted line. This is necessary since address/data bus 50 is time multiplexed between the address and data. In T2 after the address/data bus 50 has floated, an address and data buffer and multiplexer circuit 94, included in the second means, will be enabled to either: present the desired data as in a write operation, as described below; or in the case of an opcode fetch, as illustrated in FIG. 4, will float its drivers to allow external peripheral devices to drive address/data bus 50 for a read operation. Clearly, since address information on address data bus 50 is of a temporal nature, such address information must be latched in the peripheral devices. In the illustrated embodiment, CPU 20 makes such information available only during one clock cycle, T1.

CPU 20 has a special timing signal, address latch enable, ALE, generated by an external control circuit 96 included within the third means which facilitates latching of the eight lowest significant bits which are multiplexed on AD0-AD7. As shown in FIG. 4, ALE is active during T1 of every machine cycle. The cooperation of the peripherals will be described in detail below.

After the status signals and addresses have been sent out, address/data buffer 50 is disabled and control signals read, $\overline{\text{RD}}$ also generated by circuit 96, is dropped in order to enable the addressed peripheral. As shown in FIG. 4, when $\overline{\text{RD}}$ drops, digital information may be put onto address/data bus 50 from the external peripheral. After a period of time, as determined by the memory access time, valid data will appear on address/data bus 50. During T3, CPU 20 will load the data on address-/data bus 50 into the instruction register and then raise control signal $\overline{\text{RD}}$, thereby disabling the addressing peripheral. As shown in FIG. 4, the address on address bus 48 may change or float during T cycles, T4-T6, and therefore, peripheral devices may be active only during the read (or write) clock cylcle as is the case shown in FIG. 4. This protocol feature will be used to advantage as described below in relation to "hold" and "halt" cycles. Typically, opcode fetch machine cycles are three T states long, but as required by software operation, some may, as shown in FIG. 4, consume more clock cycles. In such a case, as the opcode is being decoded in the instruction register during T4, CPU 20 will be directed by the opcode to enter T5 on the next clock rather than to initiate a new machine cycle on T1 as reflected by the time flow from T1, through T2 and T3 and T4 in FIG. 3. Otherwise, CPU 20 will move from T4 other decision points and to ultimately begin a new instruction fetch.

FIG. 4 illustrates an opcode fetch machine cycle in which a pause or wait request, RDY, has been received on control line 60. RDY is coupled to control circuit 96 included within the third means. As shown in FIG. 4, the ready line is sampled during T2. If RDY is high, CPU 20 will proceed to T3 and finish executing the instruction. If RDY is low, CPU 20 will enter a T (wait) period which may include an integral multiple of clock cycles until the external peripheral has indicated that it has caught up with CPU 20 by putting RDY high again. RDY is sampled during eact T (wait) cycle. If high, the opcode machine cycle is executed beginning with T3. As reflected in FIG. 3 by the flow line existing from T2 to the T (wait) state, the T (wait) state continually recycles until a ready signal is received at which time CPU 20 continues downstream from T2. Most of the bus signals are maintained during a T (wait) state as shown in FIG. 4.

Figure 5:
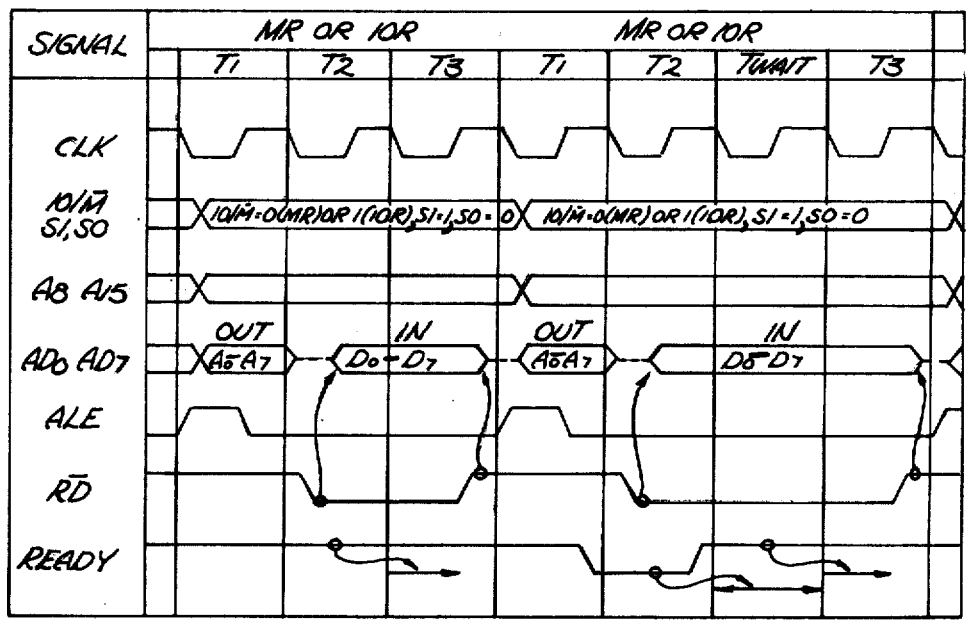
FIG. 5 is a timing diagram which shows a typical machine read cycle.

FIG. 5 illustrates a typical machine read cycle, MR or IOR. A first machine read cycle is shown without a T (wait) state, while the second machine cycle is illustrated with one such state. The machine read cycle is identical during the first three clock periods to an opcode fetch cycle shown and described in connection with FIG. 4, with the single exception that during T1 a different set of status signals IO/$\overline{M}$, S1 and S0 are naturally generated by CPU 20 for each memory read or input/output read cycle. In addition, during an opcode fetch, and as reflected in FIG. 3, during an M1 machine cycle, CPU 20 will always go from T3 to T4 while during other machine cycles, such as MR or IOR, CPU 20 will go from T3 to T1 of the next machine cycle.

Though the timing is identical, there are several functional differences between a memory read, MR, and an input/output read, IOR, cycle. In an MR cycle, the address used can have several possible origins and the data read may be placed in any of a number of appropriate registers within cpu 20. In an IOR cycle, the address on address bus 48 annd address/data bus 50 is identical and is taken from the previously fetched instruction. The ready signal, RDY, is shown as generating a T (wait) state for either memory or input/output devices. RDY could also be gated with proper status signals by well known means to generate T (wait) states only for memory devices, or only for input/output devices. Furthermore, by using one or more of the address digits, one could further quality generations of the T (wait) state according to the particular device which was being accessed.

Figure 6:
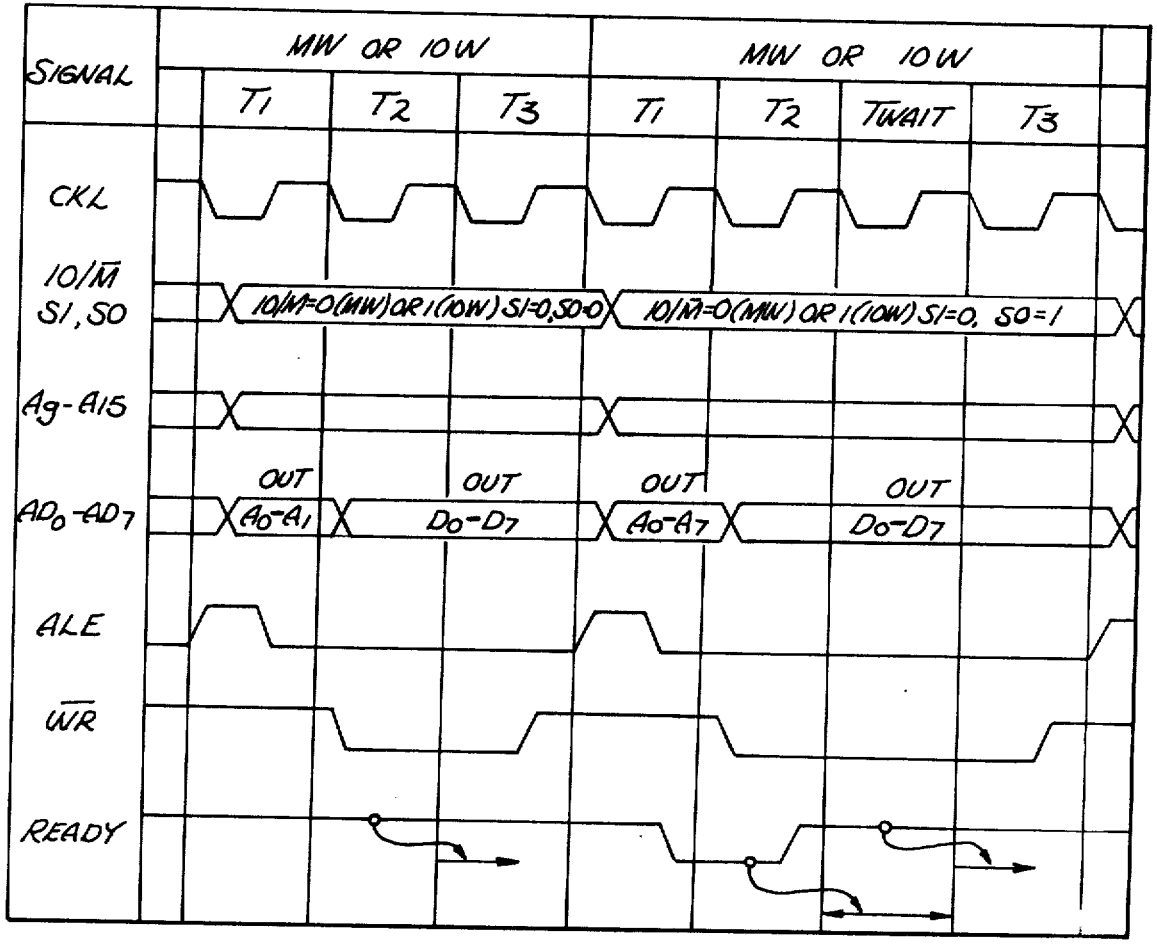
FIG. 6 is a timing diagram which shows a typical machine write cycle.

FIG. 6 shows a typical timing diagram for two successive write machine cycles, NW or IOW, one with and one without a T (wait) state. As before, CPU 20 sends a status signal during T1 which uniquely identifies that the current machine cycle being executed is a write operation to a memory or input/output device. The address of the memory or input/output location is generated by CPU 20 during T1 in the same manner as in a memory read cycle. However, at the end of T1, address/data buffers 94 remain enabled to write the data into the address memory location. CPU 20 places the data to be written on address/data bus 50 at the start of T2. At the same time the write signal, WR, generated by control circuit 96 included within the third means, is lowered to enable the addressed memory device to receive the transmitted data. During T2, RDY, is again checked to see if a T (wait) state is required. If RDY is low, one or more T (wait) states are inserted until RDY goes high. During T3, WR is raised and disables the addressed device thereby terminating the write operation. The contents of the address and data busses 48 and 50 remains valid until the next T1 state of the following machine cycle.

The opcode fetch, read and write machine cycles represent the basic operational cycles of the protocol of the present invention. A computer system could be derived and would be operable with only these capabilities. However, in a practical device, CPU 20 must be made to cooperate with other external controllers who share the peripheral devices or busses. For this reason, two additional machine cycles are required, and an interrupt acknowledge (INA) and a bus idle (BI) machine cycle.

Figure 7:
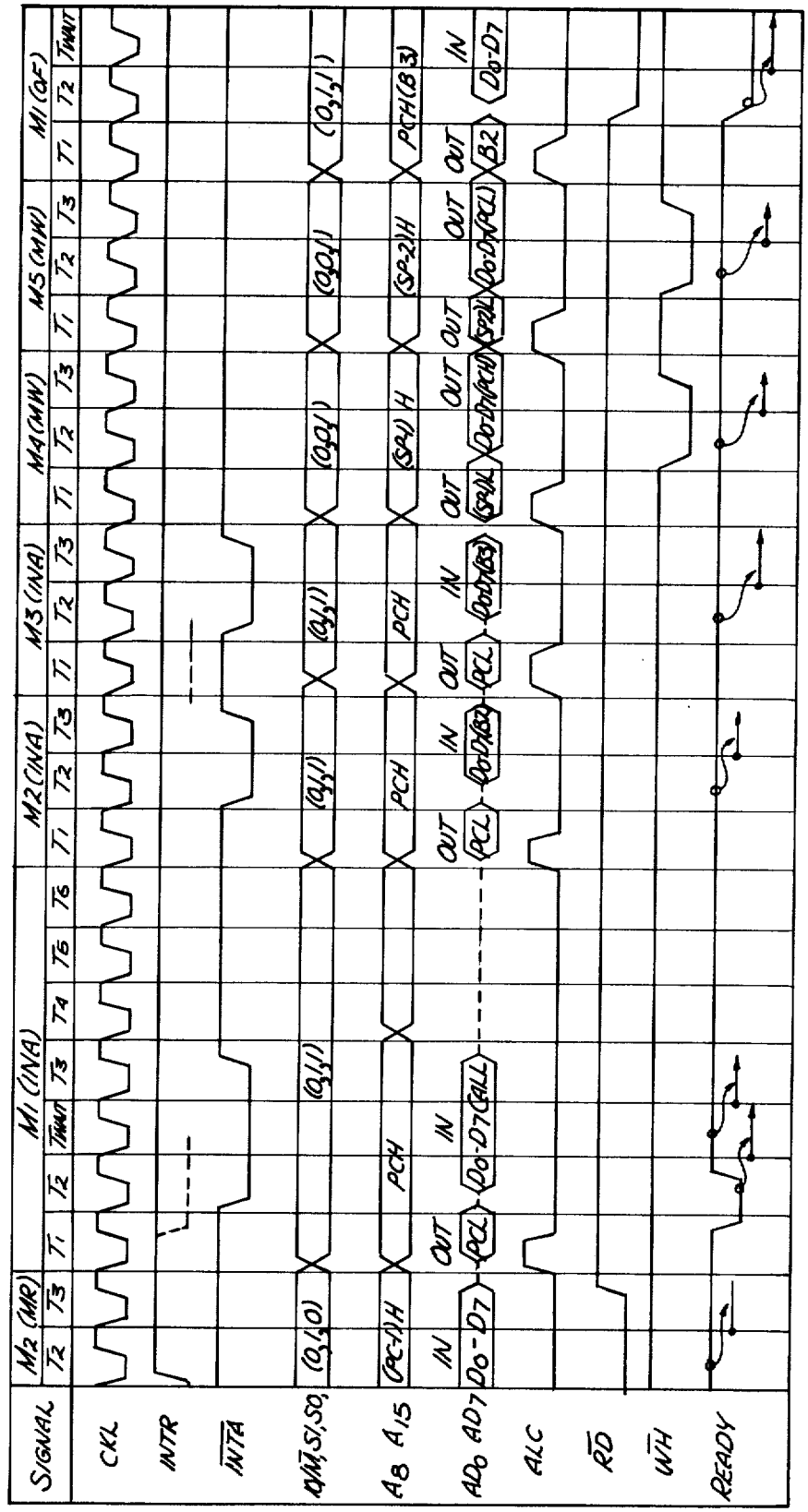
FIG. 7 is a timing diagram which shows a typical interrupt acknowledge machine cycle.

FIG. 7 illustrates an interrupt acknowledge machine cycle with a call instruction to a subroutine in response to a control signal, interrupt request, INTR generated by an external master circuit. INTR is received by an interrupt circuit 90 which is included in the fifth means. In particular, FIG. 7 illustrates the timing of CPU 20 when control signal INTR is high and an interrupt enable flip-flop, INTE F/F, contained within interrupt circuit 98 as described below, has been set by an appropriate software instruction. During the clock, CLK, of the T states preceding T1 of M1 of an interrupt machine cycle, various other interrupt signals, such as TRAP and RSTA, RSTB and RSTC as well as INTR are sampled. As described below and diagrammatically illustrated in FIG. 3, if INTR is the only valid interrupt and if interrupt enable flip-flop, INTE F/F is set, CPU 20, will reset INTE F/F and will enter the interrupt acknowledge machine cycle (INA) illustrated in FIG. 7.

As shown in FIG. 3, the INA machine cycle is identical to the opcode fetch machine cycle with an exception. Control output signal, interrupt acknowledge, $\overline{\text{INTA}}$, is generated by circuit 98 instead of read, $\overline{\text{RD}}$. Even though an address is set up on address bus 46 and address/data bus 50, the address information is ignored. When $\overline{\text{INTA}}$ is sent out, the external master circuit provides an instruction which CPU 20 may execute. Typically, such instructions are software instructions which will preserve the status of the program counter of CPU 20 by depositing it in a memory location, the stack, before jumping to an out of sequence location, such as in a program subroutine. FIG. 7 illustrates such as call opcode and shows the inclusion of a T (wait) state which is generated and included in the interrupt acknowledge machine cycle in the same as described above.

After receiving the opcode, CPU 20 decodes and determines the number of machine cycles which are required. FIG. 7 illustrates that two additional machine cycles are needed to fetch the second and third byte of the opcode instruction. After machine cycle M3, CPU 20 has accessed the entire instruction which was sent in response to interrupt acknowledge, INTA. At this point, the instruction will be executed. During machine cycles M4 and M5, CPU 20 is shown as performing a memory write machine cycles wherein the contents of the program counter is written into a memory, the stack, after which CPU 20 will place the bytes accessed in M2 and M3 into the program counter. This instruction then has the effect of jumping the execution of the program to the location specified.

Figure 8:
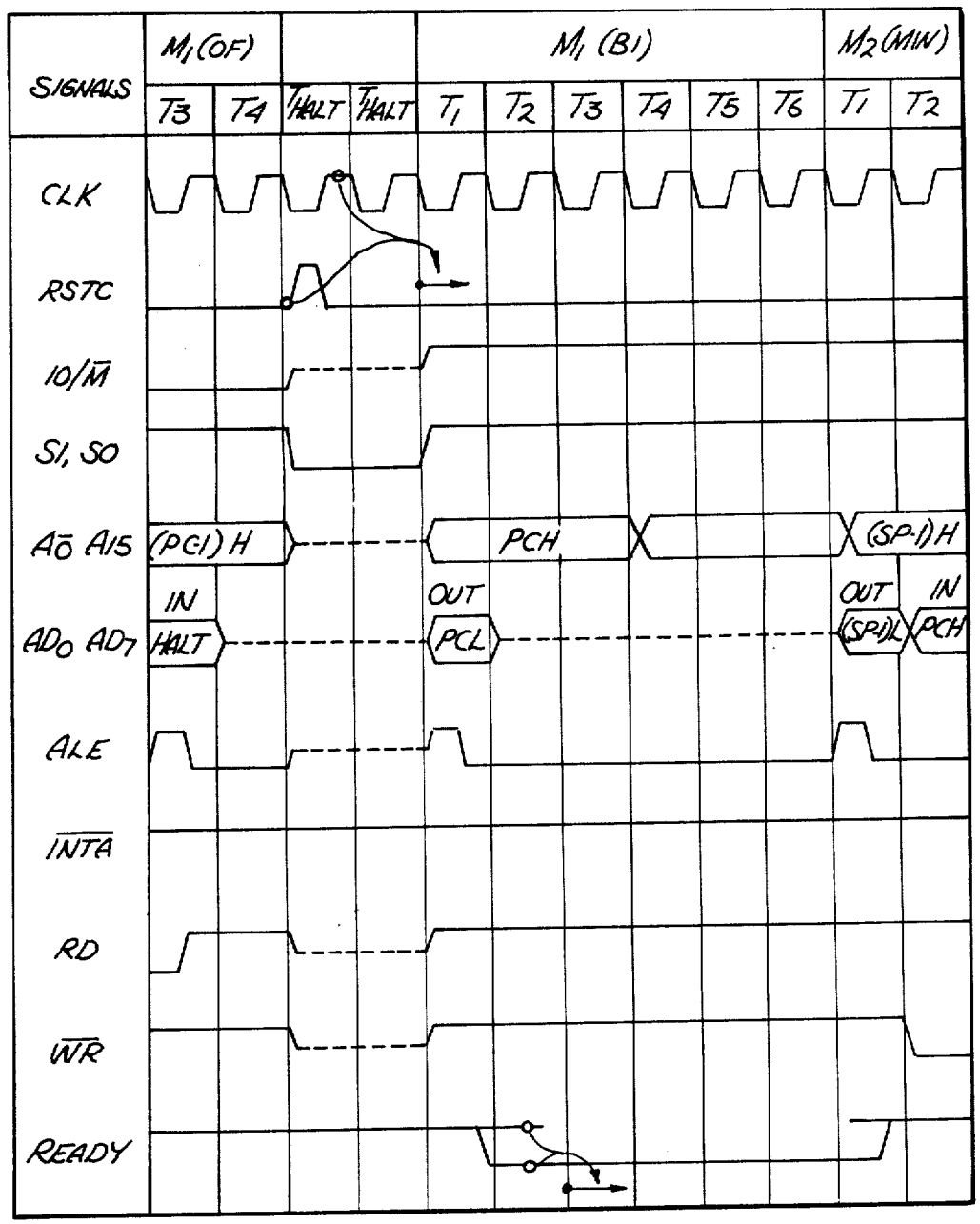
FIG. 8 is a timing diagram which shows a typical bus idle machine cycle.

Normally, during each machine cycle either a read or write operation will be executed. However, during some instructions, more than six internal T states are required for execution of a software instruction. In such a case, it may be desirable to add two or more extra machine cycles in which there is no memory or input/output operation. These cycles are referred to as bus idle machine cycles, BI. A bus idle machine cycle is illustrated in FIG. 8. It may also be desirable to have a bus idle machine cycle during the internal opcode generation for certain interrupt signals such as RSTA, RSTB, RSTC or TRAP interrupts.

FIG. 8 illustrates such an example in which a software instruction, HALT, which stops CPU processing, has just been executed in M1 (OF). CPU 20 is therefore in the T (HALT) state with its various control signals floating. The HALT state is reflected in FIG. 3 as always being generated during the T1 period. In the illustrated embodiment, CPU 20 may exit from the T (HALT) state, as reflected in FIG. 3 by receipt of a $\overline{\text{RESET IN}}$ signal, which in turn will set the interrupt acknowledge flip-flop, INTA F/F, and reset the interrupt enable flip-flop, INTE F/F. T (HALT) may also be exited if a valid interrupt occurs which will cause CPU 20 to disable further interrupts by resetting INTE F/F. In such a case, CPU 20 then proceeds to the T1 state of machine cycle M1 of the next instruction. As also reflected in FIG. 3, the presence of a hold signal, HOLD, will also cause the HOLD acknowledged flip-flop, HLDA F/F, to be set and to enter the T (HOLD) state. When HOLD is removed, HLDA F/F is reset and the T (HALT) state will be reentered unless previously removed. As shown in FIG. 8, restart interrupt, RSTC, is received during the T (HALT) state. Each of the interrupt signals will be sampled during each clock, CLK, at every T (HALT) state as well as during the clock (CLK) of the last T state before the T1 state of the M1 instruction cycle. In addition, RSTC will set an input edge triggered latch which will remain set acknowledged or reset. If, as shown in FIGS. 8 and 3, the latched interrupt is high, and as described below, interrupt enable flip-flop, INTE F/F, is high, and RSTC's mask is low, CPU 20 will be forced to exit from the T (HALT) state at the end of the next clock period and enter the T1 state of the M1 machine cycle of the next instruction, which is shown for the purposes of illustration in FIG. 8 as a bus idle. At this point, CPU 20 generates its own restart type instruction to cause the program to vector to a specific location. The machine interrupt acknowledge cycle is a normal opcode fetch cycle except no read command is issued. Instead, the restart opcode is internally generated. After machine cycle M1 (BI), CPU 20 continues execution in the normal manner. It should be noted that in a bus idle machine cycle, the state of RDY is ignored. CPU 20 will step from T2 to T3 without examining RDY.

Figure 9:
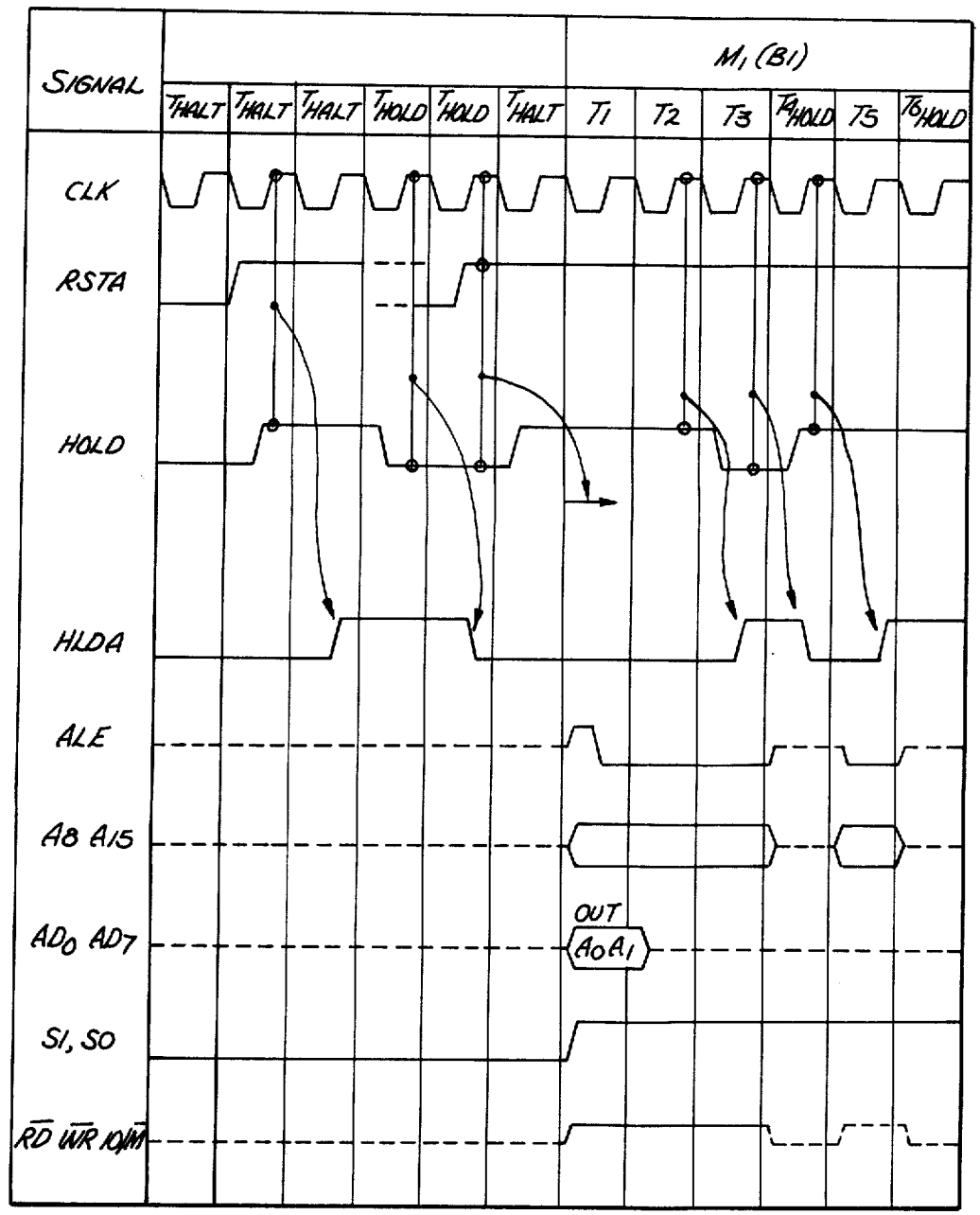
FIG. 9 is a timing diagram which shows hold and interrupt functions in a T (HALT) state.

In addition to T (halt) and T (wait), CPU 20 may include a T (HOLD) state to momentarily stop execution of machine cycles and to allow external masters to gain control of the busses for purposes such as direct memory access cycles. In a T (halt) state, CPU 20 internally latches the state of the signal, HOLD, and the enabled interrupts during CLK. If the internally latched HOLD signal is high during CLK of any such T (HALT) state, CPU 20 as reflected in the FIG. 3 will exit the T (HALT) state and enter a T (HOLD) state on the following clock. As illustrated in FIG. 9, this will occur even if a valid interrupt signal, such as RSTA, has occurred simultaneously with the HOLD signal. HOLD and the enabled interrupt lines continue to be internally latched during the T (HOLD) state. If HOLD is low during the clock, CLK, CPU 20 will exit from T (HOLD), as shown in FIG. 3, and reenter T (HALT) on the following clock. Furthermore, during the first T (HALT) state in which an internal latched enabled interrupt, such as RSTA, is high while at the same time interrupt enable flip-flop, INTE F/F, is high, CPU 20 will exit T (HALT) and enter T1 of the M1 of the next machine cycle. This cycle is illustrated in FIG. 9 and is reflected in FIG. 3. If CPU 20 is neither in T (HALT) nor T (HOLD) it will internally latch the HOLD line only during CLK of the last state before T3, such as T2 or T (wait) and during the T4 CLK of a six T state fetch. Then, if the internally latched HOLD signal is high during the next clock, CLK, CPU 20 will enter the T (HOLD) state after thee following clock, i.e., T3 or T5, respectively. Furthermore, when CPU 20 is neither in the T (HALT) nor nor T (HOLD) states, it will internally latch the state of the masked interrupts only during CLK of the last state before each T1 state of an M1 machine cycle.

Figure 10:
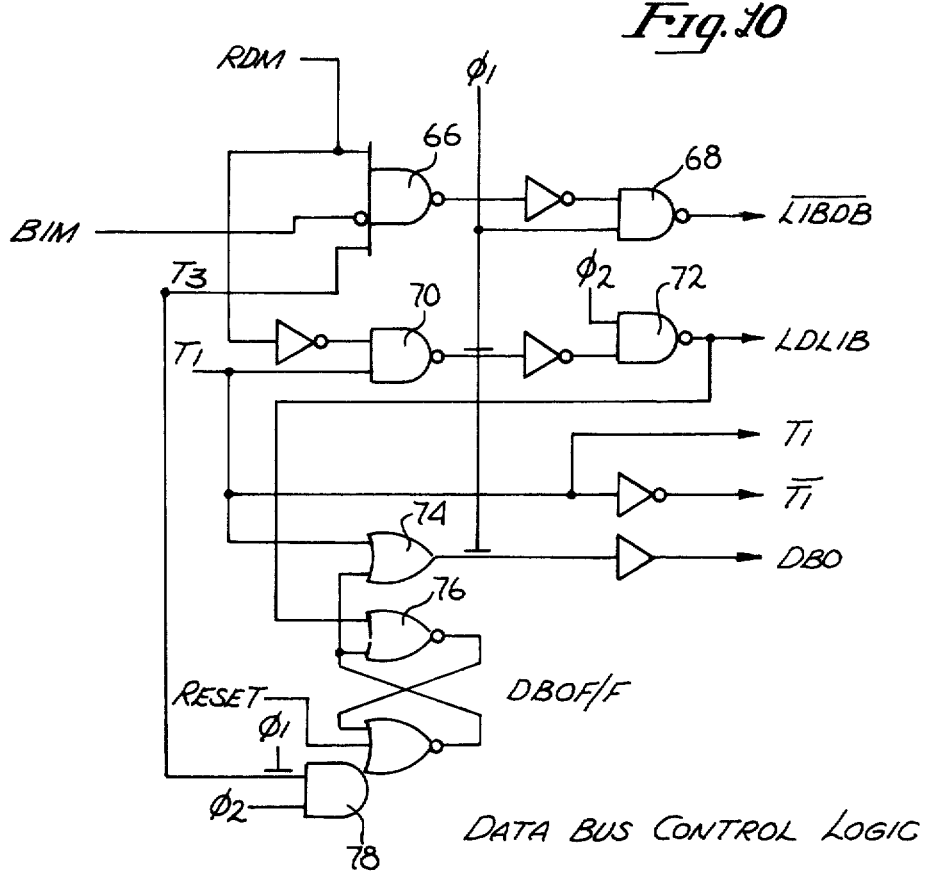
FIG. 10 is a logic circuit for a data bus control.

The generation of the various signals which comprise the bus protocol of the present invention may be understood by viewing FIGS. 10 – 14. FIG. 10 illustrates the circuitry of data bus control 100 (FIG. 2) wherein certain internal timing signals necessary for the operation of address/data buffer multiplexer 94 are generated. The inputs to data bus control 100 are derived from ALU control 44 and include an internal signal read mode signal, RDM, which is generated internally whenever CPU 20 is entering a read operation. The read mode signal RDM, may be generated in any manner well known to the art and is an easily derivable signal from the internal control circuitry within CPU 20. RDM may be combined with additional internal control and timing signals in a nand gate 102. In the illustrated embodiment, nand gate 102 has as one input a bus idle mode, BIM which is an internal fetch or access such as an internal restart interrupt fetch or a DAD instruction at its inverted input which is internally generated within interrupt circuit 98 as described below, whenever all the reset interrupts are inactive. Nand gate 102 has as its other input, internal timing signal T3. The output of nand gate 102 is inverted and forms an input to nand 104 together with internal clock 1. The output of nand gate 103 is the desired internal control signal, load internal data bus from external data bus, $\overline{\text{LIBDB}}$. Thus, $\overline{\text{LIBDB}} = \overline{\text{RDM.T3.RSINT}}.\phi1$.

The T1 clock signal may be combined with RDM through an inverter and nand gate 106 whose output in turn is strobed or synchronized by $\phi1$ and inverted to form one output to and gate 108. Nand gate 72 has as its other input, clock $\phi2$ and its output is the desired internal control signal, load data latches from the internal data bus, LDLIB. Thus, LDLIB = $\phi2$. synch $\phi1$ [T1.$\overline{\text{RDM}}$].

The internal control signal, DBO, data bus out, is generated as the output of or gate 110. Or gate 110 has as its input, the T1 clock and as its other input the Q output of DBO nor gate RS flop-flop 112. The set terminal of DBO flip-flop 112 is coupled to internal control signal, LDLIB, and its reset terminal is coupled to an internal reset control signal, RESET, used throughout CPU 20 to reinitialize internal circuitry during appropriate periods, such as power on. The generation of RESET will be described below. The other reset terminal of DBO flip-flop 112 is coupled to the output of and gate 114. And gate 114 has as its inputs, the T3 timing signal strobed by the $\phi1$ clock and as its other input the φ 2 clock. Thus, the reset input of DBO flip-flop 112 has as its logical function φ 2 synch φ 1 [T3] + RESET. The internal control signal DBO is synch φ 1 [T1 + DBO F/F].

Figure 11:
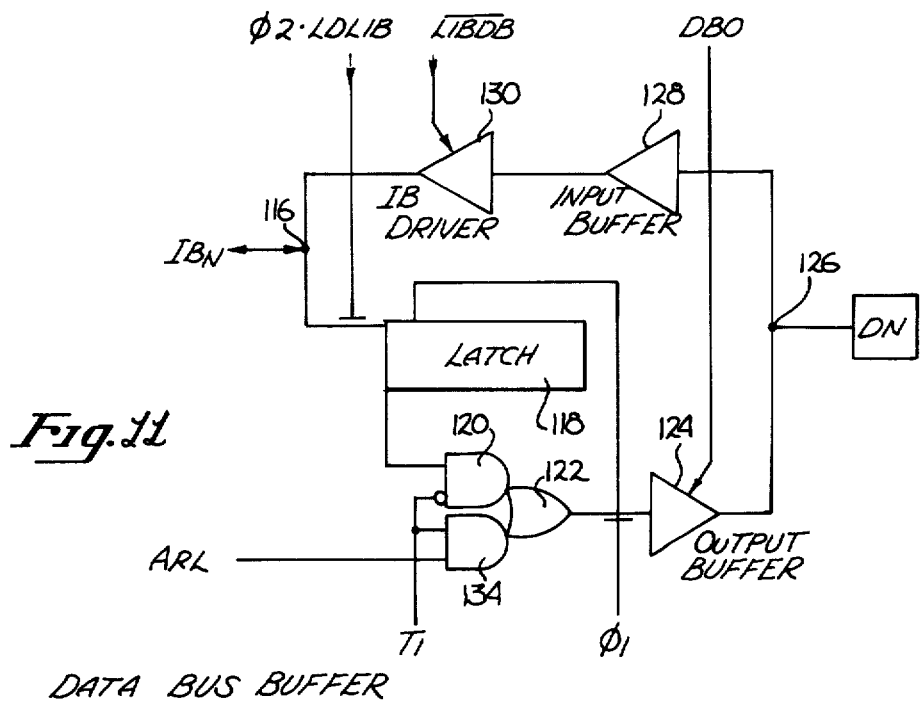
FIG. 11 is a logic circuit for an address/data buffer and multiplexer.
Figure 12:
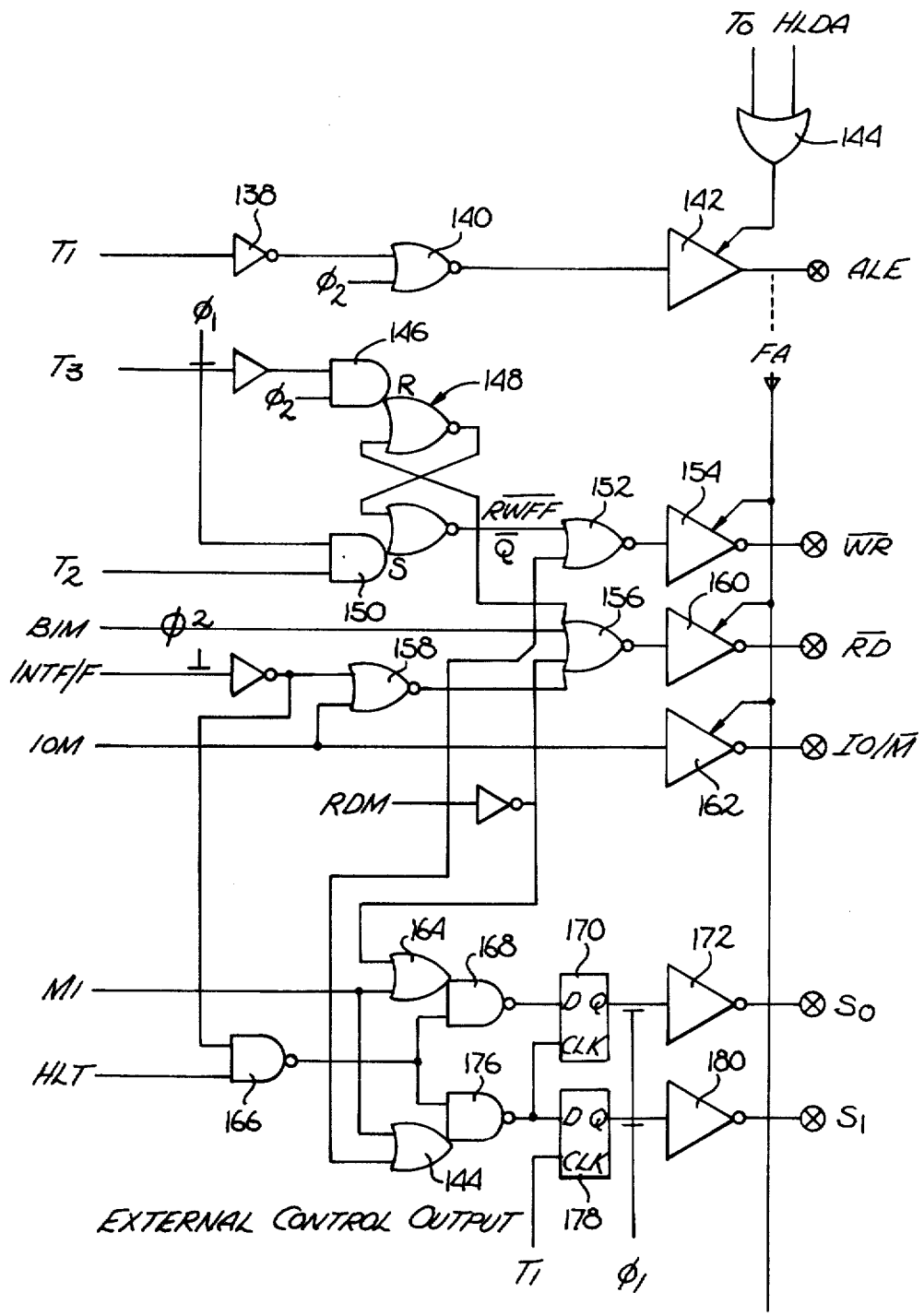
FIG. 12 is a logic circuit for an external control output circuit.

The internal control signals are combined in data buffer and multiplexing means and multiplexer 94 as shown in FIG. 11. Digital information from ALU 26 or register file 24 may be placed by means well known to the art on an internal data bus 46. Internal data bus 46 is coupled to address/data buffer multiplexer 94. One such line is shown in FIG. 11 to a typical one of a plurality of corresponding data bus buffers and multiplexers Internal data bus 46 is coupled to node 116. The data bit at node 116 is loaded into latch 118 by the occurrence of internal timing signal LDLIB described above as gated by clock φ 2. Latch 118 may be any type latch well known to the art such as coupled inverters having a feedback loop strobed by the internal clock φ 1. The output from latch 118 is coupled as an input to and gate 120. The other input of and gate 120 is coupled to timing signal T1. The output of and gate 120 is coupled to or gate 122, which in turn has its output coupled to output buffer 124 which may be floated or tristated according to internal control signal DBO. The output of or gate 122 is strobed into output buffer 124 by internal clock φ 1. Output buffer 124 is well known to the art. The output of buffer 124 is coupled to the corresponding address data out pin of CPU 20. Thus, each pin has a corresponding buffer and latch circuitry corresponding to each line of the internal data bus 46. Similarly, digital information set on the data/address pin 126 is coupled to the input of an input buffer 128 which in turn is coupled to an internal bbus driver 130 which is tristated or open-circuited according to internal control signal LIBDB, generated as described above. Driver 130 is substantially similar to output buffer 124.

Similarly, address/data bits from register file 24 may be coupled by means of bus line 132 as one input to and gate 134. The other input of and gate 134 is coupled to a T1 timing signal while the output of and gate 134 is coupled to one of the inputs of or gate 122. As before, the output of or gate 122 is strobed by clock φ1 through output buffer 124 to address/data output pin 126. Clearly, the direction of address flow through address and data buffer multiplexer 94 need only be unidirectional. Review of the logic equations and circuits for DBO, LDBIB and $\overline{LIBDB}$ will reveal that address information on pin 126 is valid only during T1 after which and gate 134 goes false. This is shown in each of the timing diagrams. Similarly, data will be coupled to pin 126 only during T1 due to the inverted T1 input on and gate 120. FIG. 10 shows that DBO is active during T1 to transmit the address and after LDLIB or T1 φ2 which sets DBO F/F until T3φ2 which resets DBO F/F. Thus, if the T state timing signals are suspended after T3, address/data bus 50 will float. This fact is used to advantage during HOLD and HALT modes. This is similarly reflected in the timing diagrams. In the same way the timing of each of the diagrams may be confirmed by the logic circuitry illustrated herein. It is to be understood that many other logic circuits may be possible to obtain the same or substantially similar results without departing from the scope of the invention.

In the same manner, address buffer 136 may be a tristated output buffer functionally similar to output buffer 124. Buffer 136 is tristated by an internal control signal, float address. FA, which is generated as described below. The input to address buffer 136 is derived from the appropriate section of register file 24 according to principles well known to the art.

Many of the principal control bus signals and status signals are generated in an external control output circuit 96 included in the third means. As shown in greater detail, in FIG. 12, control signals ALE, $\overline{WR}$, $\overline{RD}$, IO/$\overline{M}$, S0 and S1 are generated by the logic circuitry depicted. For example, ALE may be simply generated by T1 coupled through of an inverter 138 to the input of nor gate 140 having as its other input the φ2 clock. The output of nor gate 140 is coupled to the input of a tristated buffer 142 similar to output buffer 124. Buffer 142 may be floated or tristated by application of an internal control signal float ALE, FALE, which may be generated by combining timing signal T0 with control signal HLDA in or gate 144. The output of buffer 142 is the external control signal ALE. Clearly, ALE is active only during T1φ1 as reflected in the timing diagrams.

Since the timing of write, $\overline{WR}$, and read, $\overline{RD}$, is substantially identical, the logic for the generation of the wire and read control signals is shared to a large extent. Timing signal T3 is strobed by clock φ1 to one input of and gate 146. The other input of and gate 146 is coupled to the reset terminal of a nor gate, RS, flip-flop 148. The set terminal of nor gate flip-flop 148 is coupled to the output of and gate 150. And gate 150 has as its input, timing signal T2 and clock 1. The $\overline{Q}$ output of nor gate flip-flop 148, $\overline{RWFF}$ is coupled to one one input of nor gate 152. The other input of nor gate 152 is coupled to RDM, the read mode signal which is internally generated as described above. RDM is active only during a write operation. As before, the output of nor gate 152 is coupled to a tristated inverted buffer 154 which generates as its output the external control signal WR. Buffer 154 is floated or tristated by application of the internal control signal float address, FA, described below. Similarly, the $\overline{Q}$ output of nor gate flip-flop 148 is coupled to one of the inputs of nor gate 156. The other inputs of nor gate 156 are coupled to internal control signal $\overline{RDM}$ and the output of nor gate 158. As before, the output of nor gate 156 is coupled to an inverted tristated buffer 160 which is selectively tristated by internal control signal FA. The output of buffer 160 is the read signal, $\overline{RD}$. Nor gate 158 has as its input an inverted interrupt flip-flop signal INT F/F described in greater detail below as strobed by clock φ2. The other input of nor gate 158 is an internal status signal IOM. IOM is merely the unbuffered IO/$\overline{M}$ status signal which may be generated internally, by means well known to the art, such as by a decoder coupled to the instruction register to assume a true state whenever an input/output instruction is being executed and a false state whenever a memory instruction is being executed. The timing of IO/$\overline{M}$ is illustrated in the wave diagrams, FIGS. 4 – 9. IOM is coupled to the input of a tristated buffer 162 which is also tristated by the internal control signal FA. The output of buffer 162 is the external control signal IO/$\overline{M}$. It should be noted that INT F/F, which is set when $\overline{INTA}$ is issued, and IOM will inhibit $\overline{RD}$ except when it is an I/O read. $\overline{WR}$ is selected only during $\overline{RDM}$.

The status control signals, S0 and S1, are generated by symmetrical circuitry. Or gate 164 has as its inputs $\overline{RDM}$ and the M1 timing signal. Nand gate 166 has as its inputs INT F/F and an internal control signal HLT which is internally generated by CPU 20 in response to a software HALT instruction by means well known to the art. The output of nand gate 166 and 164 are provided as the inputs to nand gate 166. The output of nand gate 168 is clocked by T1 into the D terminal of D-type flip-flop 170. The output of flip-flop 170 is strobed by clock $\phi 1$ into an inverted output buffer 172 to generate status control signal S0. Similarly, or gate 174 has as its nputs the M1 timing signal and RDM. The output of or gate 174 is coupled to the input of nand gate 176 which has its other input the output of nand gate 166. The output of nand gate 176 is clocked by T1 into the D terminal of D-type flip-flop 178. In the same manner, the Q output of D-type flip-flop 178 is strobed by clock $\phi 1$ into the input of inverted output biffer 180. The output of buffer 180 is the external status signal S1. The logic equations for status signals S0 and S1 as generated by the logic circuitry illustrated are:

$$S0 = \overline{HLT} \cdot \overline{INT\ F/F} \cdot (M1 + \overline{RDM}),$$

$$S1 = \overline{HLT} \cdot \overline{INT\ F/F} \cdot (M1 + RDM).$$

It is to noted that S1 can be interpreted as a RD/WR status signal on all bus transfers. The S1 and S0 signals are latched at T1 and synchronized by $\phi 1$ before being transmitted. S0 and S1 do not have tristated buffers and therefore are always specified. The encoding of S0 and S1 in Table 1 may be verified against the above logic equations.

Figure 13:
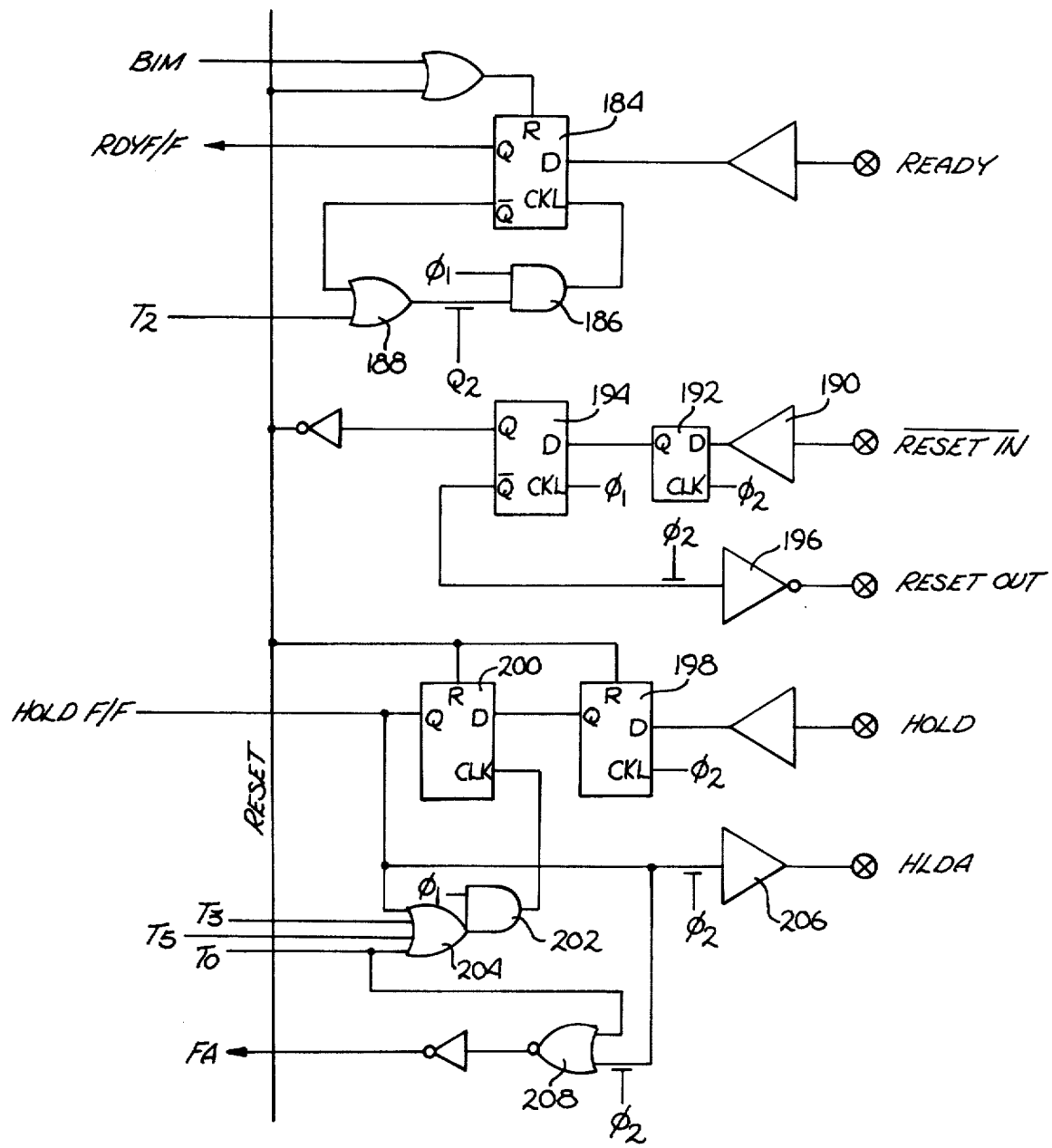
FIG. 13 is a logic circuit for an external control input circuit.
Figure 14:
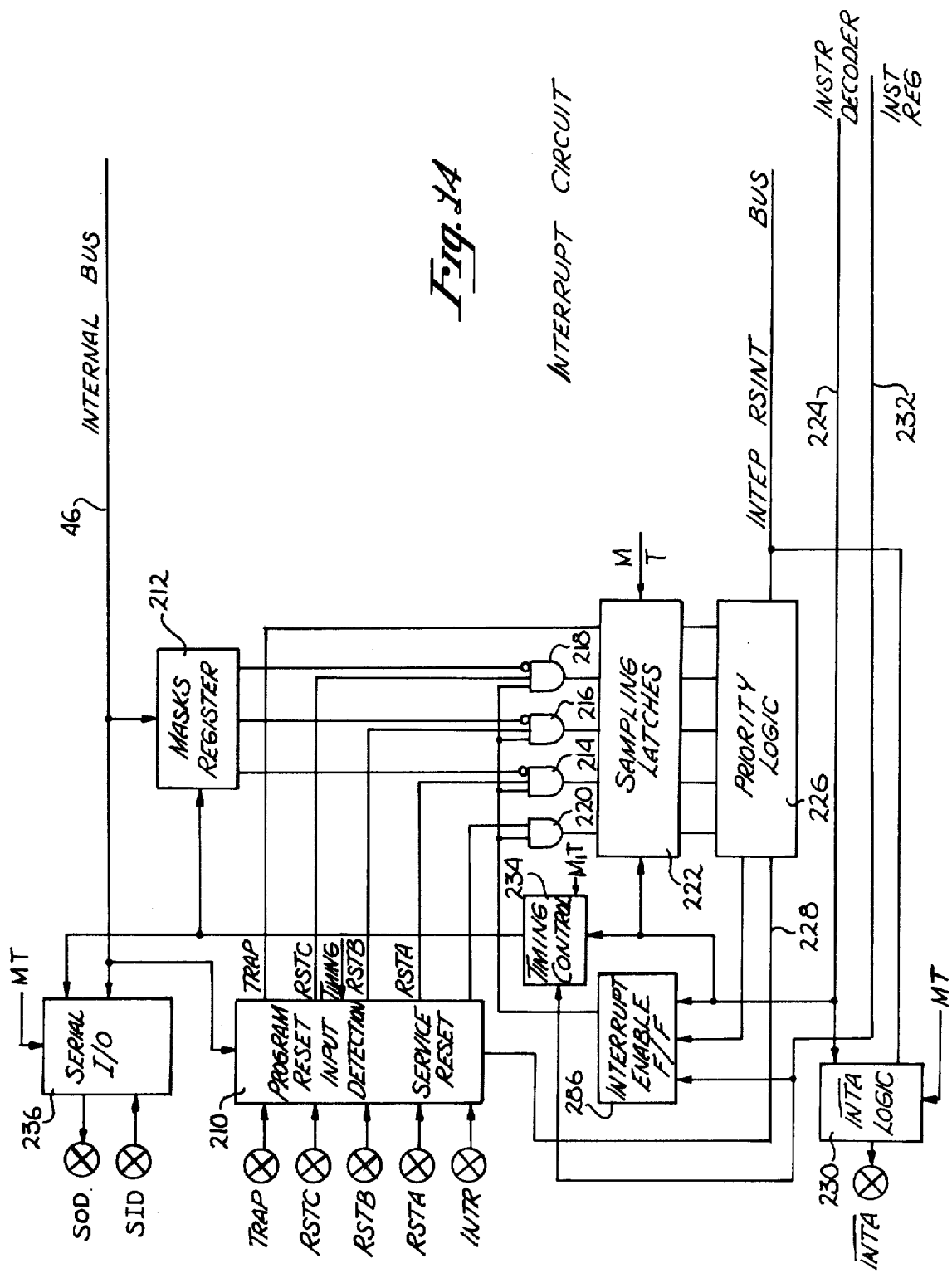
FIG. 14 is a block schematic for an interrupt control circuit.

The external control input signals and their corresponding acknowledge responses are generated by external control input circuitry 182 together with external control output signal generator 96, collectively comprising the control signal generating and receiving means. The control signal generating and receiving means may also include circuit blocks 22, 94, 96, 98, 100, 136 and 182 as illustrated in FIG. 1. FIG. 13 illustrates in greater detail the generation of these signals. For example, the external control input line 23 RDY, which may be considered as part of the third means, is buffered into the D terminal of a D-type flip-flop 184. The Q output of flip-flop 184 is the internal control signal RDY F/F. The state of flip-flop 184 is sampled during T2, as described above, by the internal timing and logic control circuitry of CPU 20, according to principles well known to the art, to determine whether or not a T (wait) state should be inserted. Flip-flop 184 is reset by an internal reset signal, RESET, which is generated as described below, and is also reset by BIM. As shown, flip-flop 184 is clocked by the output of and gate 186. The inputs of and gate 186 are the internal clock $\phi 1$ and the output of or gate 188 as synchronised or strobed by internal clock $\phi 2$. In turn, or gate 188 has its inputs internal clock T2 and the $\overline{Q}$ output of flip-flop 184.

RESET IN is an external control input signal which may be buffered through a buffer 190. The output of buffer 190 is double synchronised through D-type flip-flops 192 and 194. Flip-flop 192 coupled to the D input of flip-flop 194 which is clocked by internal clock signal $\phi 1$. The inverted output of the Q terminal of flip-flop 194 is the internal reset signal, RESET. The Q output of flip-flop 194 is strobed by clock $\phi 2$ to an inverted output buffer 196 to generate the external control signal, RESET OUT. The internal control signal, RESET, is used to reinitialize or reset many of the internal flip-flops such as RDY F/F, INT F/F, Hold F/F, the interrupt flip-flops and flip-flops affecting $\overline{RD}$, $\overline{WR}$, $\overline{INTA}$ and DBO.

The external input control signal, HOLD, is buffered and coupled to the D input of D-type flip-flop 198. Flip-flop 198 is clocked by internal clock $\phi 2$ and has its Q output coupled to the D input of flip-flop 198. Similarly, the Q ouput of flip-flop 200 generates the internal control signal, HOLD F/F. The external input control signal, HOLD indicates to CPU 20 that some other master is requesting the use of the data and address busses. Hold acknowledge, HLDA, is issued as described below when CPU 20 is ready to relinquish the buses, but CPU 20 will not release the buses until it is finished cycling through them. As described above HOLD is doubly synchronised. The first flip-flop 198 samples the condition of HOLD with each clock $\phi 2$. A second flip-flop 200 is sampled only at $\phi 1$ during T3, T5, the halt mode and when HOLD is high. This is effected by coupling the clock terminal flip-flop 200 to the output of and gate 202. The input to and gate 202 is the clock $\phi 1$ and the output of or gate 204. Or gate 204 has as its inputs T3, T5 and an internal timing signal T0 (reset or halt) which is assumed whenever CPU 20 emters a reset mode. T0 (reset or halt) may be generated by CPU 20 according to principles well known to the art. The other input of or gate 204 is coupled to the Q output of flip-flop 200. The Q terminal of flip-flop 200 is also strobed by clock $\phi 2$ to an output buffer 206 to generate the external control signal HLDA.

Finally, the internal control signal, FA, is generated by the inverted output of nor gate 208. Nor gate 208 has as its inputs internal control signal T0 (reset) and the Q output of flip-flop 200 as synchronised or strobed by the internal clock $\phi 2$. Both flip-flops 198 and 200 are reset by the internal reset signal, RESET.

The serial input/output data feature, and various interrupt signals and their corresponding acknowledgement signals, are generated by interrupt circuitry 98 as shown in FIG. 1. As shown with greater particularity in FIG. 14, the external interrupt signals RSTA, RSTB, RSTC and TRAP are coupled to an input detection circuit 210 which may be comprised of latches or flip-flops which serve to retain the condition appearing at the external interrupt pins. In the presently illustrated embodiment, as described above RSTC is an edge-triggered flip-flop well known to the art. Any type of flip-flop or latches or combination of falling or rising edge-triggered or level flip-flop may be employed according to design choice. Restart interrupts RSTA-RSTC may be programmably masked by mack register 212 and the gates 214, 216 and 218. Mask register 212 may be a register of any type well known to the art and has as its inputs the first four lines of internal data bus 46. The outputs of mask register 212 are determined according to the mask bits which have been inserted into mask register 212 by the programmer. The other inputs to each of and gates 214, 216 and 218 are coupled to their respective interrupt latch or flip-flop in detection circuit 210, and to interrupt enable flip-flop INTE F/F.

Similarly, the external control input signal interrupt, INTR, is directly coupled to an and gate 220 which has its other input coupled to INTE F/F. The outputs of each of the and gates 214, 216, 218 and 220 and the interrupt flip-flop, TRAP are coupled to a corresponding plurality of sampling latch circuits 222, well known to the art. Sampling latch circuitry 222 examines the state of the interrupts during $\phi 2$ of the last T state of each instruction and during the T (HALT) mode. For this purpose, sampling latches 222 are coupled to the M and T timing signals generator as well as other appropriate internal timing or control signals which may be derived by well known design principles by reference to the timing diagrams of FIGS. 4–9. Similarly, sampling latch 222 may be coupled to an instruction decoder bus 225 coupled in turn to instruction decoder 34 so that sampling may also be preconditioned on desired software instructions. The output of sampling circuit 222 is coupled to a priority logic circuit 226 which may order the priority among the various interrupt signals according to any scheme desired by the circuit designer. In the presently illustrated embodiment interrupt signal, INTR, has the lowest priority, RSTA the next, and so forth, up to TRAP which has the highest. Priority logic circuitry 226 thus will generate control signals on a priority bus 228 to direct that certain input detection logic flip-flops be reset. Priority logic circuit 226 may also generate certain internal control signals such as $\overline{\text{RSINT}}$ and INT F/F. $\overline{\text{RSINT}}$ is logically part of BIM. $\overline{\text{RSINT}}$ is active during an instruction cycle after one of the restart interrupts is recognized (RSTA, RSTB, RSTC, TRAP). $\overline{\text{RSINT}}$ may also be used to block the generation of both $\overline{\text{LIBDB}}$ and $\overline{\text{INTA}}$. Priority logic circuit 226 also may generate signals coupled to CPU 20 to initiate generation of the restart interrupt addresses. As described above INT F/F inhibits $\overline{\text{RD}}$ and $\overline{\text{RSINT}}$ inhibits the sampling of RDY since an interrupt restart is an internal cycle which does not require an external memory or input-output access.

The external control signal interrupt knowledge, $\overline{\text{INTA}}$, is generated by $\overline{\text{INTA}}$ logic circuit 230. The input to $\overline{\text{INTA}}$ logic circuit 230 are drawn from instruction decoder bus 224, the outputs of priority logic circuit 226, the M and T state generator, and instruction registers 28 from bus 232. $\overline{\text{INTA}}$ is timed exactly in the same manner as $\overline{\text{RD}}$ and $\overline{\text{WR}}$ as shown in FIG. 7. A $\overline{\text{INTA}}$ flip-flop using the same timing inputs as read and write generates $\overline{\text{INTA}}$. The set terminal on the $\overline{\text{INTA}}$ flip-flop is thus described by the logic equation T2. 1.(RDM.$\overline{\text{IOR}}$). The reset terminal of the INTA flip-flop is described by the logic equation synch $\phi1[\text{T3}]\phi2$ + $\overline{\text{INT F/F}}$ + RSINT + RESET. Therefore, the $\overline{\text{INTA}}$ flip-flop cannot be set unless INT F/F is true and RSINT is false. A modified RDM signal is used as part of the set logic for the $\overline{\text{INTA}}$ flip-flop. In other words, the set mode is RDM with the logical exception that INTA is not set during any input-output read cycle, IOR. Implementation of this logic is well known and may be performed by random logic.

Internal timing of the interrupt logic circuit 98 may be effected by timing and control circuit 234. Timing and control circuit 234 may have its input, selected lines from instruction register 28, instruction decoder 34 and the M and T state generators. Timing and control circuit 234 is coupled to mask register 212 and provides an enabling rate signal and proper write signals into the latches for the serial input-output latch circuit 236 for SOD and SID. Thus, according to commands received from timing and control circuit 234 to input-output latches 1236, a selected bit from the accumulator within CPU 20 or other appropriate register may be coupled to latch circuit 236 by internal data bus 46. According to the software programming control, the data in the accumulator may then be shifted and presented as input or output through serial input-output latch circuit 236. The timing, shifting and latching of serial input and output data at pins SOD and SID, employs well known logic and timing circuitry which may be controlled by software routines or instructions. Such instructions such as the SIM and RIM instructions have been added to in the 8080 assembly language.

Figure 15:
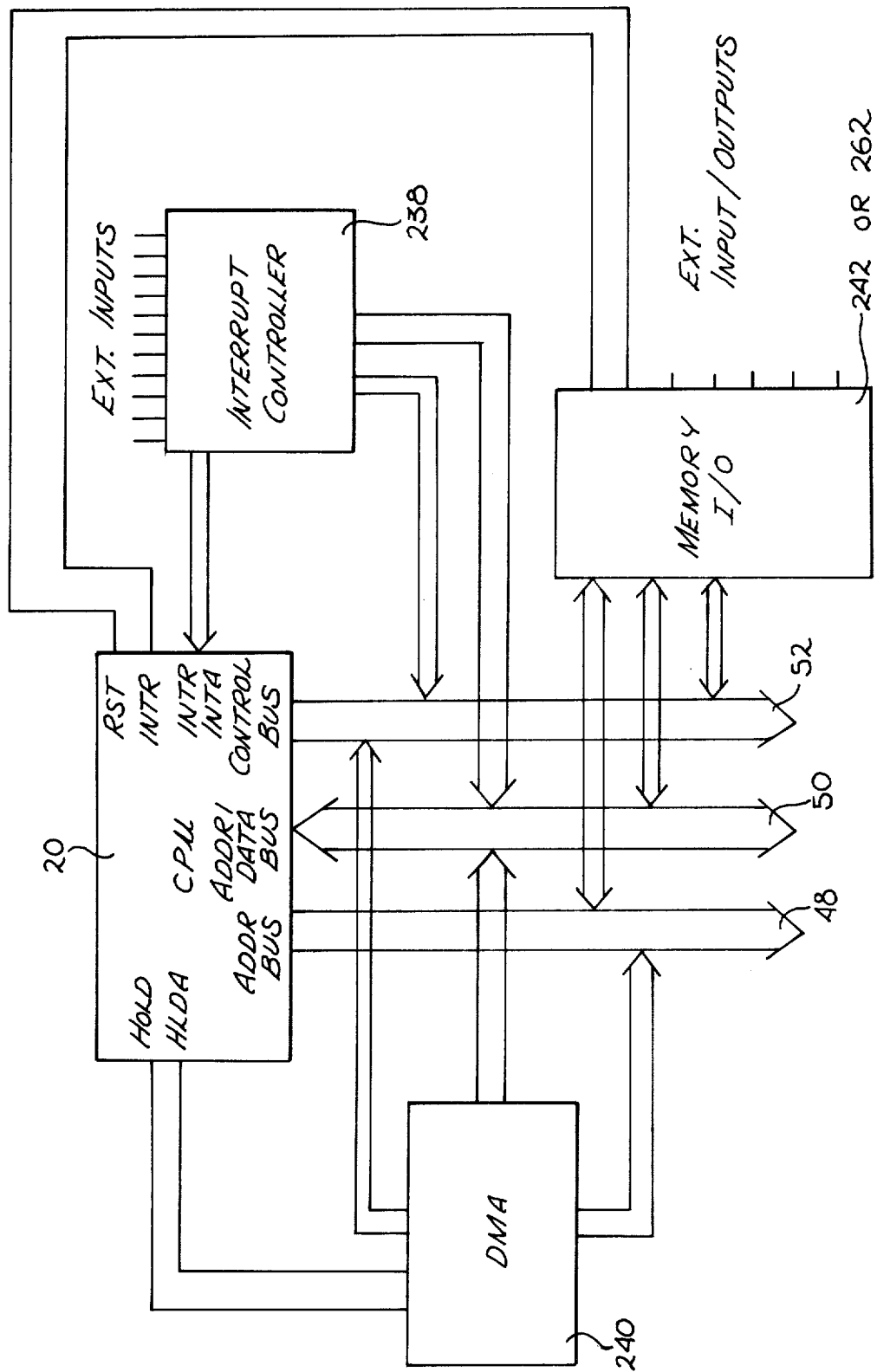
FIG. 15 is a block diagram of a larger computer system using the protocol of the present invention.

FIG. 15 illustrates a larger system in which the external control lines are used. CPU 20 is shown as having eight pins coupled to address bus 48 and eight pins coupled to the multiplexed address/data bus 5). The external output control signals ALE, $\overline{\text{RD}}$ and $\overline{\text{WR}}$, IO/$\overline{\text{M}}$, RESET OUT, RDY, and CLK, form control bus 52. Terminals INTR and $\overline{\text{INTA}}$ are coupled a separate interrupt controller 238, such as an Intel 8259, which is also coupled to address/data bus 50 and control bus 52. Interrupt controller 238 may have a plurality of external interrupt input lines coupled to external devices such as printers, card readers, tape readers and so forth from which information may be set on bus lines and coupled to a plurality of input/output peripherals which may form part of the larger computer system. HOLD and HDLA may be coupled to an external direct memory access or other master circuit 240, such as an Intel 8257, which is similarly coupled to address bus 48, address data bus 50, and control bus 52. In such a case, master 240 may have a multiple of inputs coupled to external data input/output devices and terminals, such as cards, tape readers, and instrumentation wherein it might be desirable to access other peripheral devices in the larger computer system independently of the control of CPU 20.

FIG. 2 illustrates a minimum computer systems which employs a CPU, a "memory" device and an "input/output" device. For practical packaging and design reasons both peripherals have memory and input/output capacity although they will be denoted as a memory or input/output device. Clearly, additional peripheral units, both memory and input/output units, as well as other types of peripherals well known to the art may be added in either a standard input/output mapped mode or memory mapped mode according to ordinary design principles. FIG. 2 illustrates a standard IO mapped input/output wherein CPU 20 of the present invention is coupled to a PROM or ROM memory device 242 which is adapted to operate with the external bus signals of CPU 20.

Memory peripheral 242 as illustrated in FIG. 2 also includes an on-clip latch 244 coupled to a decoder 248 and a read/only memory (ROM) or programmable read only memory (PROM) 252. Latch 244 is enabled by ALE. Control and logic circuit 250 is coupled to external control signals IO/$\overline{\text{M}}$ and $\overline{\text{RD}}$, and $\overline{\text{WR}}$ to enable and disenable the active elements of memory 242 to execute the proper memory operation. Typically, the computer program is stored within ROM 252. Memory 242 may be provided with one or more input/output ports coupled to registers, Port A, 254, and Port B, 256. Two parts, Port A and Port B are illustrated within memory device 242 and are shown as coupled to direct destination registers, DDRA and DDRB. Direct destination registers are programmable registers, well known to the art, which may designate the bits of Ports A and Ports B as input or output bits. DDRA 258 is coupled to register 256 and DDRB 260 may be coupled to register 254. Both DDRA and DDRB are reset by the RESET OUT bus signal. A ready logic circuit 256 generates the ready signal RDY which is coupled to control bus 52 whenever memory 242 is in condition to accept further data or instructions from CPU 20. No ready signal is required for I/O device 262 because I/O device 262 is generally faster than CPU 20. Each of the elements illustrates within memory 242 are well known to the art with the exception that latch 244 has been added in order to make memory device 242 compatible with multiplexed address/data bus 50.

Device 262 is a random access memory (RAM) 266 and includes input/output capacity. However, I/O device 262 includes an on-chip latch and decoder 264 enabled by ALE. Control and logic circuit 268 is coupoled to the RESET OUT, $\overline{RD}$, $\overline{WR}$ and IO/$\overline{M}$ signals whereby RAM 266 and input/output registers 270, 272 and 274 may be selectively enabled and disenabled. Input/output device 262 may also contain an internal timer 276 which is synchronized to CLK and provides the internal timing for I/O device 262. Command and status register 278, well known to the art, is a programmable register by which the input/output bits of registers 280, 282 and 284 may each be programmed as input or output terminals according to the command loaded into command and status register 278. The various elements of input/output device 262 are well known in the prior art, with the exception that an on chip latch 264 is included in order to make I/O device 262 compatible with CPU 20 of the present invention.

A standard memory mapped input/output device identical to I/O device 262 may also be employed with a CPU of the present invention by using the memory addresses for input/output selection according to well known principles.

Figure 16:
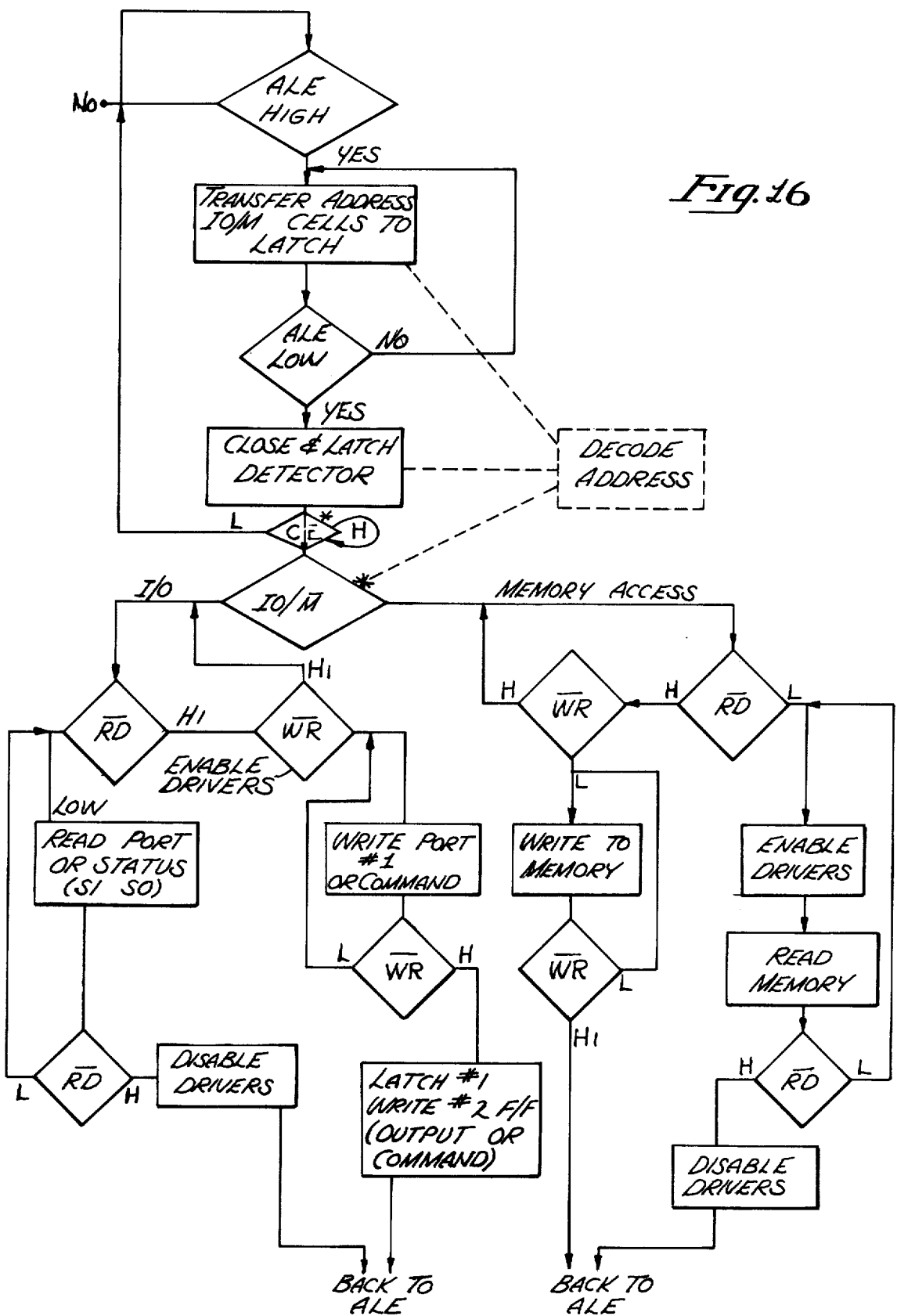
FIG. 16 is a flow chart illustrating the logical flow of a peripheral in a computer system of the present invention.

The response of peripheral devices to the protocol of the present invention may be better understood by viewing FIG. 16. FIG. 16 is a flow chart which represents the logical steps typically undertaken by memory device 242 and I/O device 262. During the first decision cycle, ALE is examined. If true, the address, IO/$\overline{M}$ and the chip enables are transferred to the appropriate latch and/or control circuit. After ALE goes low the latch is closed and the input digital information is retained within the latch. If the module has also been strobed by chip enable, it is then free to enter a memory or input/output operation according to the status of IO/$\overline{M}$. In an input/output operation, device 262 will sample $\overline{RD}$ to determined if a read command has been received from CPU 20. If $\overline{RD}$ is low, a selected register or the status command register is read on to the data bus. After the read signal is removed, $\overline{RD}$ goes high and the data bus drivers are disabled and I/O device 262 returns to its initial state. However, if $\overline{RD}$ is high, I/O device 262 examines $\overline{WR}$ to determine if a write command has been given. If $\overline{WR}$ is low, the information on the data bus is written into the selected port or command/status register. In the embodiment illustrated the output/input and command registers are two stage, masterslave latches which may be stepped through their bistable status as shown in FIG. 16. After the write signal is removed, $\overline{WR}$ goes high and the output or command will be latched in the appropriate register. At this point I/O device 262 returns to its initial state.

If on the other hand, IO/$\overline{M}$ indicates that a memory operation is to be executed, memory device 262 examines the read command to determine whether or not a read operation is requested. If so, $\overline{RD}$ is low and the data buffers are enabled and memory device 262 cycles through a read operation of the selected address location. When the read command is removed, $\overline{RD}$ goes high, the data drivers are disabled, and memory 262 is returned to its initial state. On the other hand, if there is no read command, memory 262 will examine the write command. If a write operation is called for, $\overline{WR}$ goes low and the data on the data bus is written into the memory in a standard write operation. After the write command is removed, $\overline{WR}$ goes high and is returned to its initial state. Operation of device 242 is similar except there is no memory write operation.

Although the present invention has been described with respect to a particular embodiment, it is entirely within the scope and spirit of the present invention that many alterations and modifications may be made in the internal circuitry of the peripherals, in the internal circuitry of the CPU, and in such external masters and control circuitry which may be coupled thereto with which the external bus and control signals of a CPU according to the present invention may be employed. It is to be expressly understood that the details of internal control may also be altered by ordinary design considerations depending on the nature of the software instructions which are chosen:

We claim:

1. An apparatus for bidirectionally transferring digital information, such as words and bytes of addresses, codes and data, in a plurality of transfer modes, said apparatus being connected to a plurality of peripheral devices, said apparatus and plurality of peripheral devices being coupled by an external control bus and an external address and data bus, said apparatus coupled with first means, said first means for selectively processing digital information in response to a progammable set of instructions collectively denoted as a program and for employing a plurality of internal control signsals to control said apparatus with respect to said bidirectional transferring of digital information, said apparatus comprising:

means for multiplexing digital information on at least part of said external address and data bus to and from said first means, said multiplexing means being coupled to said first means and to said external address and data bus; and means for generating and receiving a plurality of external bus control signals being connected to said external control bus encoded for communicating with said peripheral devices the availability of at least part of said address and data bus for transfer of digital information according to one of said plurality of transfer modes, said generating and receiving means being coupled to said first means, whereby said apparatus is characterized by simplified control of said address and data bus in that the number of connections devoted to addressing and data transfers is reduced by the multiplexing of said digital information on said external address and data bus.

2. The apparatus of claim 1 wherein said address and data bus is grouped into a first and second set of bus lines, said first set being an address bus only, and said second set being multiplexed as an address/data bus.

3. The apparatus of claim 2 wherein said multiplexing means includes a multiplexing and buffer circuit for selectively coupling said digital information between said first means and said second set of bus lines of said address and data bus, and a data bus control circuit for generating internal multiplex command signals coupled and to said first means to said multiplexing and buffer circuit to control transfer of digital information through said multiplexing and buffer circuit to and from said first means.

4. The apparatus of claim 1 further comprising a serial input/output circuit for latching and buffering digital information wherein said digital information is transferred to and from said first means in serial format in response to internal serial command signals, SOD, SID, received from said first means.

5. An apparatus for transferring digital information such as words and bytes of addresses, codes and data in a plurality of transfer modes between said apparatus and a plurality of peripheral devices, said peripheral devices having input/output and memory devices therein, said apparatus being used in combination with first means, said apparatus and first means in combination for selectively processing and selectively transferring digital information in response to a program and for generating a plurality of internal control signals, said first means employing clock timing, said apparatus comprising:

an external address bus having coupled thereto an address buffer coupled in turn to said first means, said address bus for coupling at least a first portion of a digital address (ADDR1) included as part of said digital information to said peripheral devices;

an external address/data bus having coupled thereto second means, said second means for selectively multiplexing and buffering at least a second portion of a digital address (ADDR2) included as part of said digital information and a data signal (DATA) on said address/data bus, said second means being coupled to said first means; and a control bus having coupled thereto third means for generating and receiving a plurality of external bus control signals encoded at least in part to communicate with said peripheral devices the status of said address and address/data busses for transfer of digital information thereon according to one of said plurality of transfer modes, said third means being coupled to said first means, whereby said apparatus is characterized by simplified control of said address and address/data busses in that the number of connections devoted to addressing and data transfer is reduced by multiplexing said digital information on said external address/data bus.

6. The apparatus of claim 5 wherein said control bus includes:

an address latch enable signal (ALE) generated by said third means and coupled to a first line of said control bus during a first clock cycle of each said transfer of digital information to permit said digital address (ADDR2) to be latched in said peripheral devices;

a read signal ($\overline{RD}$) selectively generated by said third means and coupled to a second line of said control bus to indicate to said plurality of peripheral devices that said address/data bus is available for transfer of digital data;

a write signal ($\overline{WR}$) selectively generated by said third means and coupled to a third line of said control bus to indicate to said plurality of peripheral devices that digital information on said address/data bus is to be written into said peripheral device; and an input-output/memory signal (IO/$\overline{M}$) selectively generated by said third means and coupled to a fourth line of said control bus to indicate to said plurality of peripheral devices whether said read ($\overline{RD}$) and write ($\overline{WR}$) signals are directed to said input/output device or memory device within said plurality of peripheral devices.

7. A method for transferring digital information, such as words and bytes of addresses, codes and data, between a central processor and a plurality of peripheral devices in a plurality of transfer modes, said central processor being coupled to an address bus, a multiplexed address/data bus and control bus and having a plurality of clock cycles, said method comprising the steps of:

generating an input-output/memory status signal (IO/$\overline{M}$) during at least a first clock cycle on a first line of said control bus to indicate to said peripheral devices whether a later generated operation signal is in a memory or input/output transfer mode, said input-output/memory status signal having a first value indicating a memory transfer mode and having a second value indicating an input/output transfer mode;

generating a first portion (ADDR1) of a digital address signal on said address bus during at least said first clock cyle to provide a partial address to said peripheral devices;

generating a second portion (ADDR2) of said digital address signal on said address/data bus during said first clock cycle to provide the remaining portion of said address to said peripheral devices;

generating an address latch enable signal (ALE) during said first clock cycle on a second line of said control bus to permit said second portion (ADDR2) of said digital address to be latched into said peripheral devices;

generating a data signal (DATA) on said address/data bus during at least a second clock cycle to provide digital information to be transferred between said central processor and peripheral devices; and generating said operation signal during at least said second clock cycle on a selected line of said control bus to indicate that said address/data bus is ready for transfer of digital information;

whereby digital information is transferred in a simplified format on said address and address/data busses in that the number of connections devoted to addressing and data transfer is reduced by multiplexing said digital information on said external address/data bus.

8. The method of claim 7 wherein said operation signal is a read signal ($\overline{RD}$) on a third line of said control bus to indicate that the digital information held by the addressed peripheral device is to be read onto said address/data bus.

9. The method of claim 7 wherein said operation signal is a write signal ($\overline{WR}$) on a third line of said control bus to indicate that the digital information on said address/data bus is to be written into the addressed peripheral device.

10. The method of claim 7 further comprising the steps of:

receiving a serial input data signal (SID) on a terminal of said central processor during a clock cycle preceding said first clock cycle;

sampling said serial input data signal during said clock cycle preceding said first clock cycle in response to a selected instruction (RIM); and generating a stored bit in said central processor in response to said selected instruction (RIM) and in response to said serial input data signal (SID), said stored bit having the same logical value as said serial input data signal (SID); and repeating said steps of receiving said serial input data signal, sampling said serial input data signal and generating said stored bit to generate a finite plurality of stored bits logically equivalent to said serial input data signal at serial sequences of said first clock cycle.

11. The method of claim 7 further comprising the steps of:
sampling one of a finite plurality of stored bits within said central processor in response to a selected instruction (SIM); and
generating a serial output data signal (SOD) during said first clock cycle on a terminal of said central processor, said serial output data signal having a logical value equal to said sampled stored bit;
repeating said steps of sampling one of said plurality of stored bits and generating a serial output data signal having a logical value equivalent to said sampled one of said plurality of stored bits until each of said stored bits of said finite plurality of bits has been sampled and a serial output data signal generated corresponding thereto.

* * * * *